INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY

OSCILLATING PREDICTION DEVICE (ELECTRICAL)

INVENTORS
WILLIAM H. NEWELL
EDWARD G. BURGESS
NORMAN J. ZABB
STAMATES I. FRANGOULIS

BY Victor D. Borst
ATTORNEY

INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY.

INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY.

March 16, 1965 W. H. NEWELL ETAL 3,174,030

DEVICE FOR PREDICTING VALUES OF A FLUCTUATING SYSTEM AT A PREDETERMINED FUTURE TIME

Original Filed May 29, 1953 15 Sheets-Sheet 12

INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY INVENTORS
WILLIAM H. NEWELL
EDWARD G. BURGESS
NORMAN J. ZABB
STAMATES I. FRANGOULIS
BY Victor D. Borst
ATTORNEY

OSCILLATING PREDICTION CIRCUIT
IN SYSTEM OF FIGURES 15 AND 16.

INVENTORS
WILLIAM H. NEWELL
EDWARD G. BURGESS
NORMAN J. ZABB
STAMATES I. FRANGOULIS
BY Victor D. Borst
ATTORNEY United States Patent Office 3,174,030 Patented Mar. 16, 1965

3,174,030

DEVICE FOR PREDICTING VALUES OF A FLUCTUATING SYSTEM AT A PREDETERMINED FUTURE TIME

William H. Newell, Mount Vernon, Edward G. Burgess, Jr., Kew Gardens, Norman J. Zabb, Brooklyn, and Stamates I. Frangoulis, Flushing, N.Y., assignors to Sperry Rand Corporation, a corporation of Delaware Original application May 29, 1953, Ser. No. 358,324, now Patent No. 2,996,706. Divided and this application May 26, 1955, Ser. No. 511,152
12 Claims. (Cl. 235—150)

The present application is a division of application Serial No. 358,324 filed May 29, 1953, and now U.S. Patent No. 2,996,706.

The present invention relates to a method and apparatus for computing the characteristics of a fluctuating system for a predetermined future period and for predicting the value of a quantity at the end of said period, even though the mathematical form of said system is varying, and although, the invention has a wide range of utility, it is particularly useful in predicting the pitch angle (deck tilt) and the heave (deck level) of a floating platform, such as the flight deck of a carrier, at a future predetermined time.

In guiding an airplane in its approach towards a floating platform, such as the deck of a carrier for landing, it is necessary to predict the future time of landing and the pitch angle and heave or level of the deck at the predicted time, to assure safe landing. Since the carrier is continuously oscillating in pitch and has a continuous oscillating vertical movement during the approach of the airplane, it becomes necessary to compute continuously the characterics of the fluctuating motions of the carrier and to predict therefrom the pitch and heave of the carrier at the future predicted time of landing. Since the movement of the deck does not follow a uniform mathematical pattern or equation, it is seen that the matter of determining with accuracy the pitch and heave at a future time is not a simple problem.

One object of the present invention is to provide a novel method and device by which the value of a quantity at a predetermined future time in a fluctuating system may be predicted, even though the mathematical form of the system may be continuously varying and the variations in the system may not be following a definite mathematical formula.

Another object is to provide a novel method and device by which the future pitch angle of a floating platform, such as the flight deck of a carrier, at the predicted future instant of landing can be computed and predicted.

A further object is to provide a novel method and device by which the future heave or flight deck level of a floating platform, such as that of a carrier at the predicted future instant of landing can be computed and predicted.

In accordance with the features of the present invention, the value of a quantity in a fluctuating system at a future predetermined time is predicted by following a cycle of operation including the steps of determining the present value of the quantity, deriving the future characteristics of said system from said present value and predicting from the future characteristics of said system so derived the value of the fluctuating system for said predetermined time, and repeating said cycle of operation again and again up to the predetermined time but with the present values of the quantity revised for each cycle according to their true magnitudes, to obtain a succession of predicted values of the quantity for said predetermined time. In accordance with the more specific aspects of the present invention, the succession of predicted values is obtained by a mechanizing operation as successive physical quantities and these physical quantities are smoothed as they are obtained, to merge them into a substantially predicted quantity running from the end of the first cycle to near said predetermined time and increasing in accuracy as said predetermined time is approached.

The general features of the present invention described are applied to the determination of the pitch angle and level of a floating deck, such as the flight deck of an aircraft carrier, at a future predetermined time, by employing the present values of the pitch angle and level in each cycle of the oscillating system, to determine the future characteristics of the pitch angle and level fluctuating systems and to determine therefrom the values of pitch angle and level for said predetermined time. By repeating these cycles up to the future predetermined time but with present values of the pitch angle and level brought up to date, and by smoothing the successive physical quantities representing the future values of pitch angle and deck level and obtained by mechanization, a continuous quantity is obtained, representing the future values of the pitch angle and deck, this continuous quantity becoming more accurate as said future predetermined time is approached.

Various other objects, features and advantages of the present invention are apparent from the following discription and from the accompanying drawings, in which FIG. 1 is a diagram of a rate measuring device of the mechanical type to be used as part of an oscillating system for determining in accordance with the more specific aspects of the invention, the predicted pitch angle and predicted deck level (heave) of a floating deck at a predicted future instant, the solid lines in said diagram indicating mechanical movements such as shaft rotations;

Figures 1, 2:
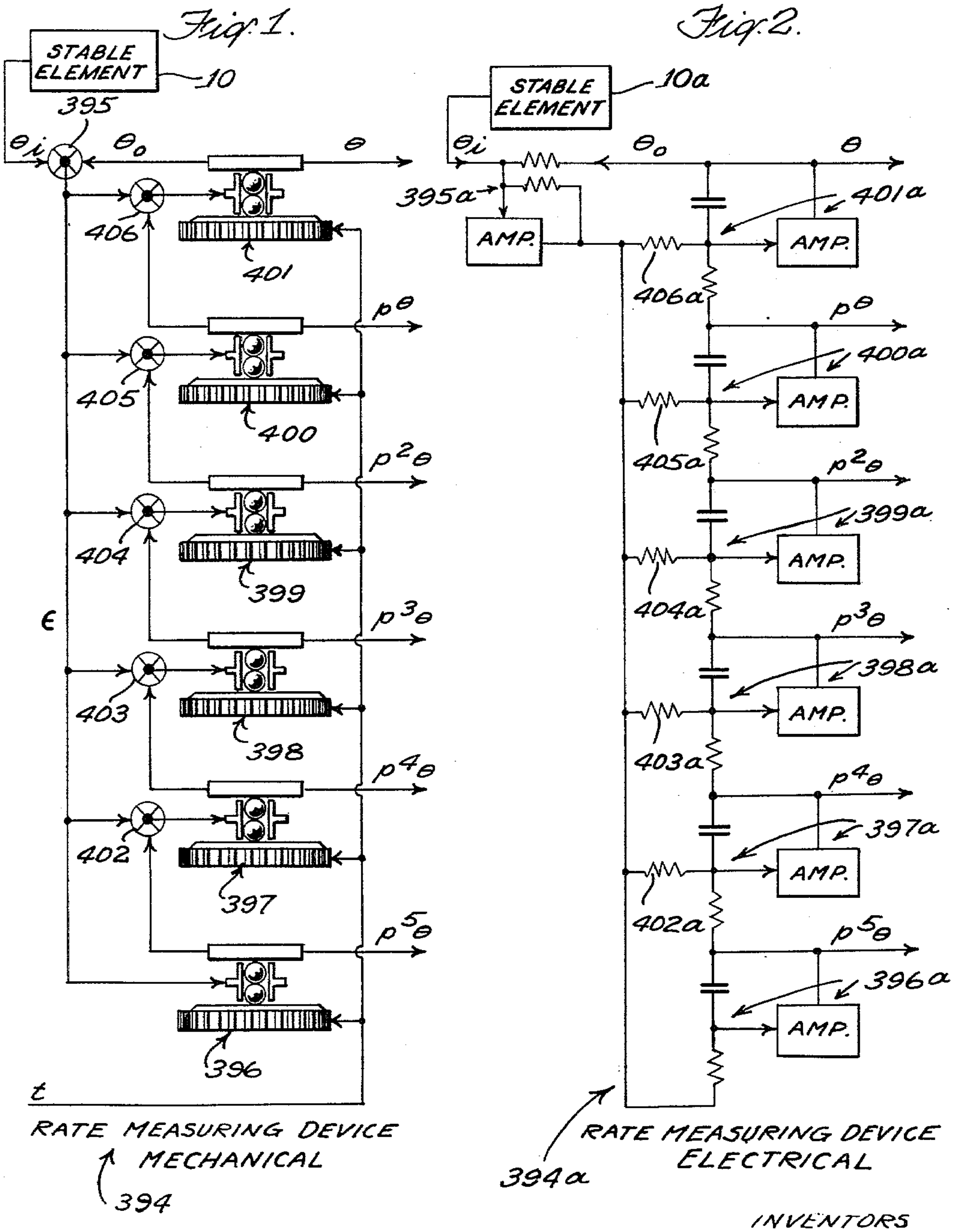
FIG. 2 is a diagram of a rate measuring device of the electrical type to be used as part of the oscillating system, the solid lines in said diagram representing electric signals and specifically voltages proportional to the values of the quantities indicated on said diagram.
Figure 3:
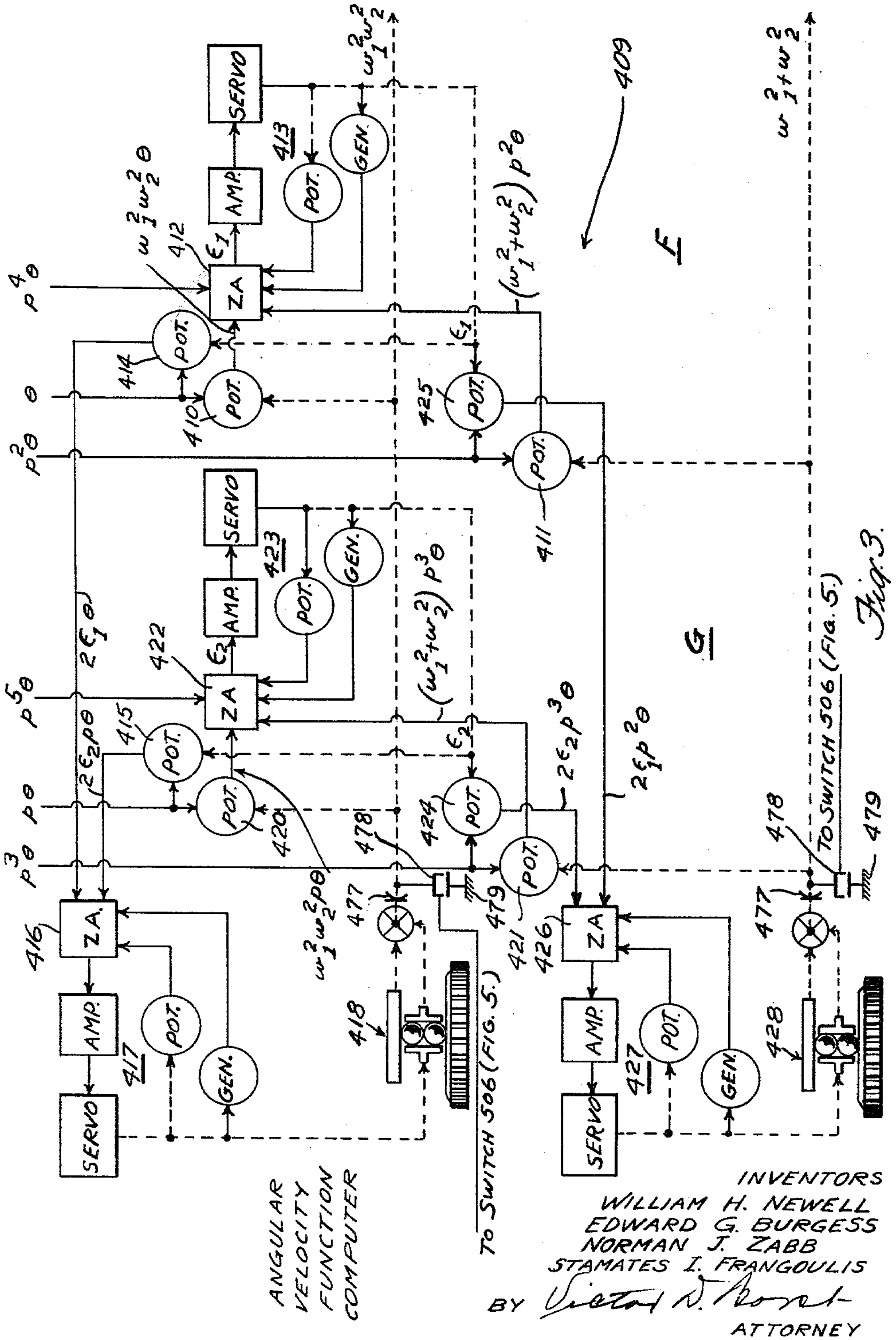
FIG. 3 is a diagram of an angular velocity function computer to be used as part of the oscillating system, the solid lines in said diagram indicating electric signals and specifically voltages and the dotted lines indicating shaft displacements.
Figure 4:
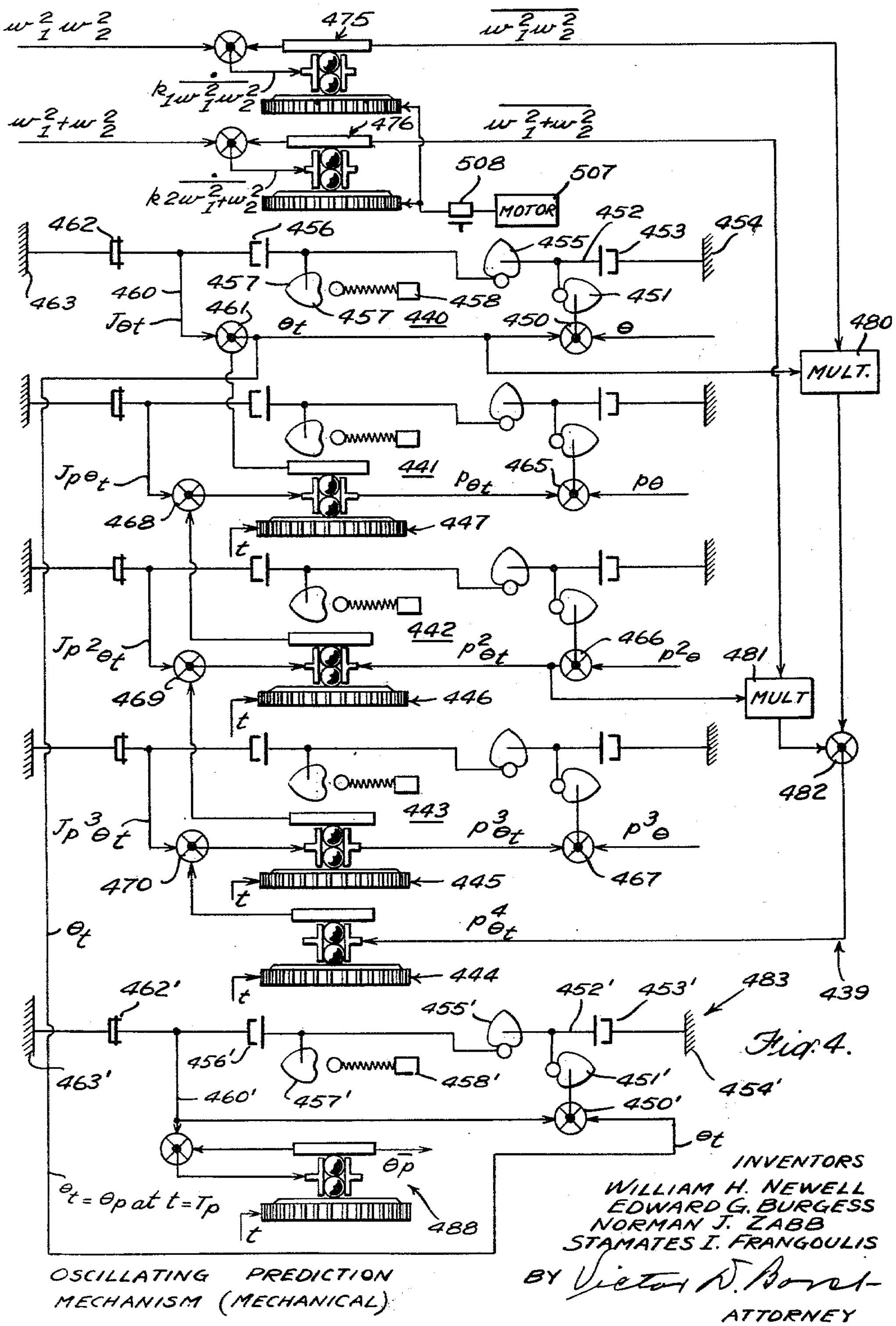
Figure 5:
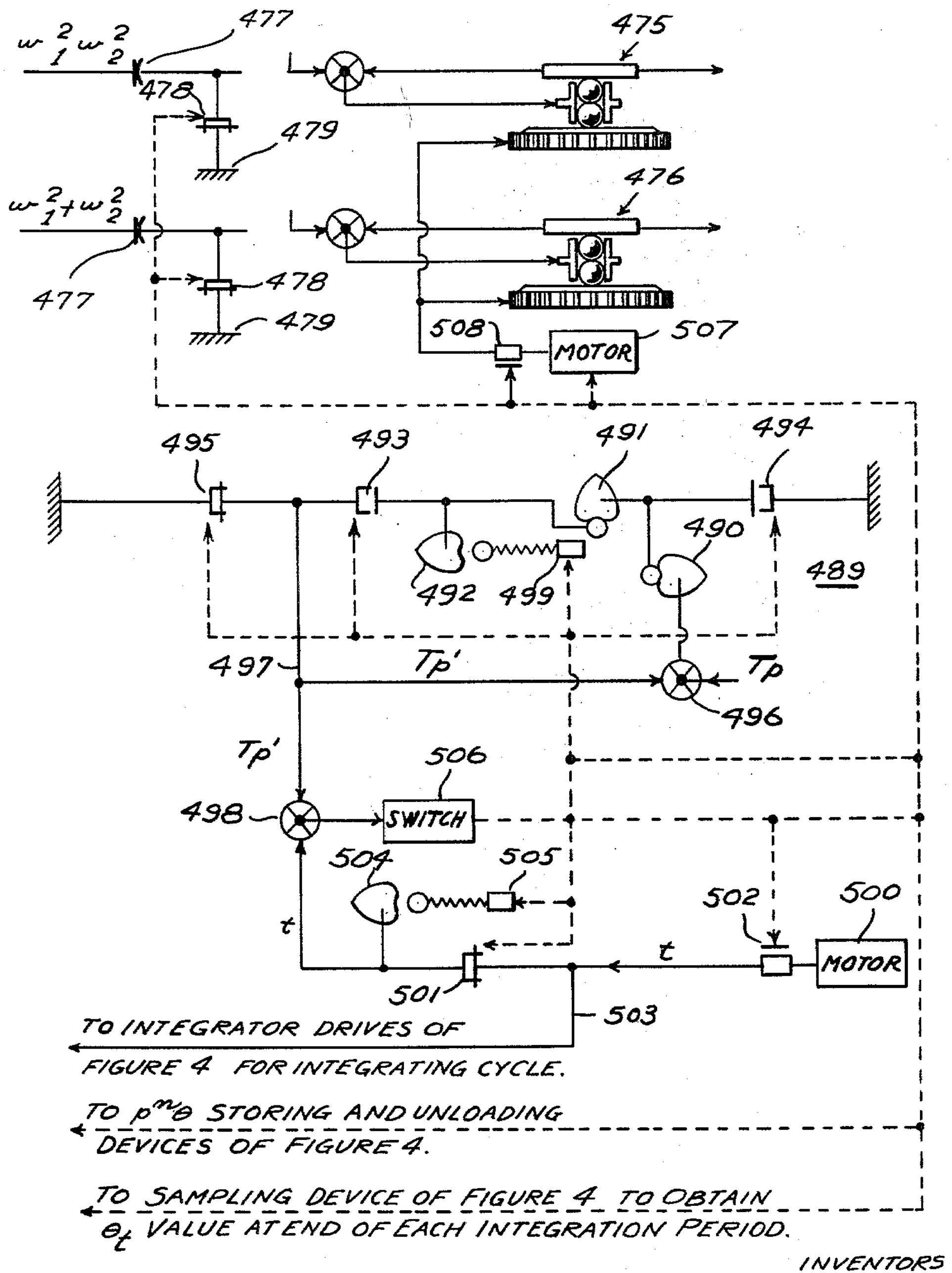
Figure 6:
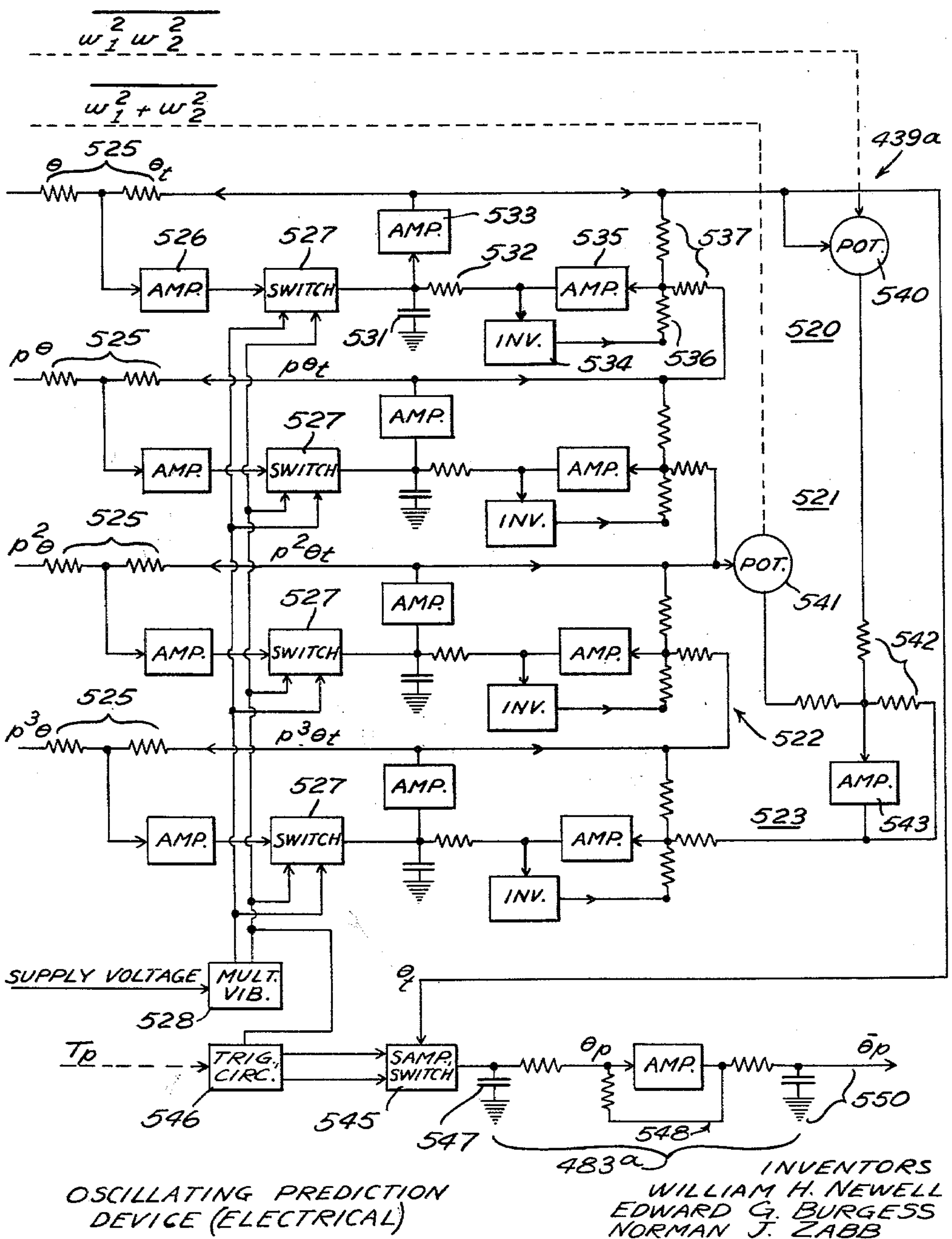
Figure 7:
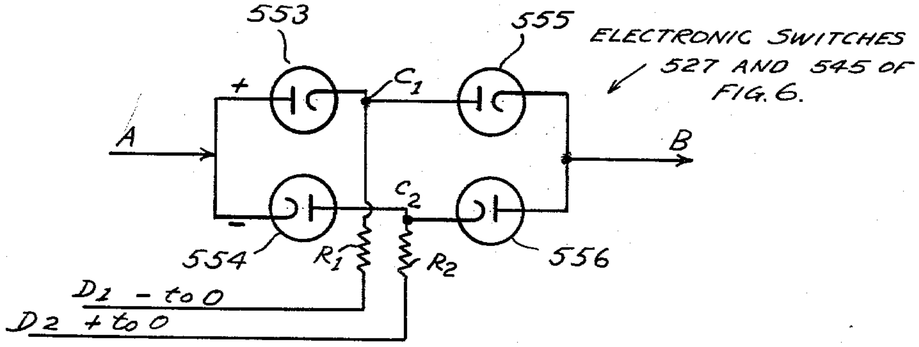
Figure 8:
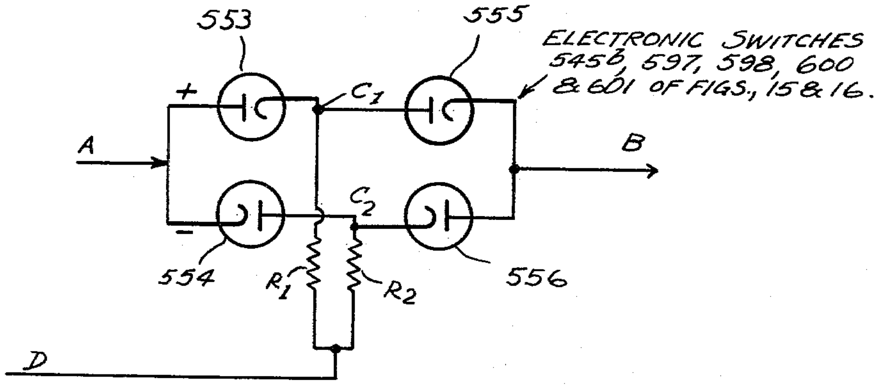
Figure 9:
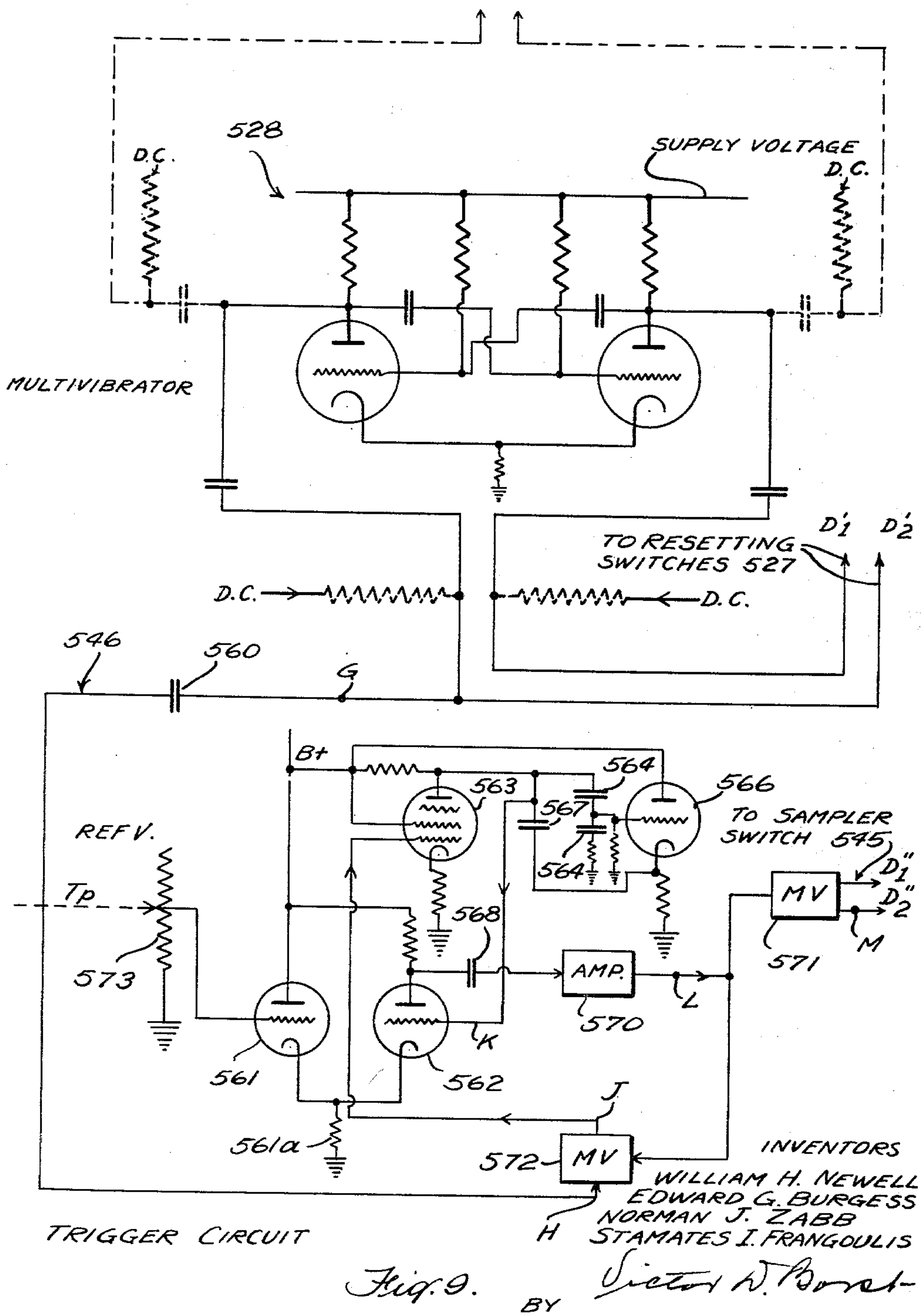
Figure 10:
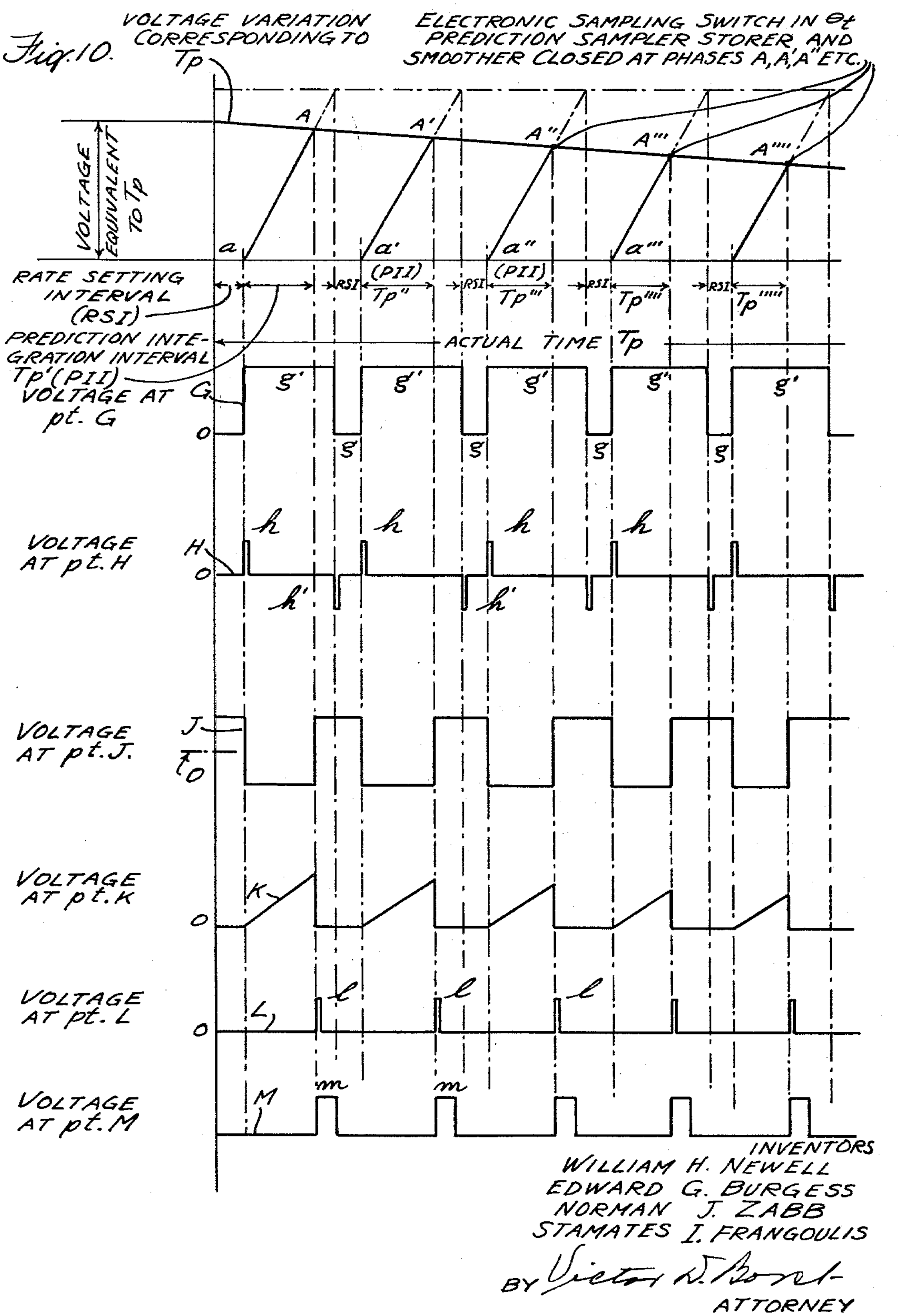
Figure 11:
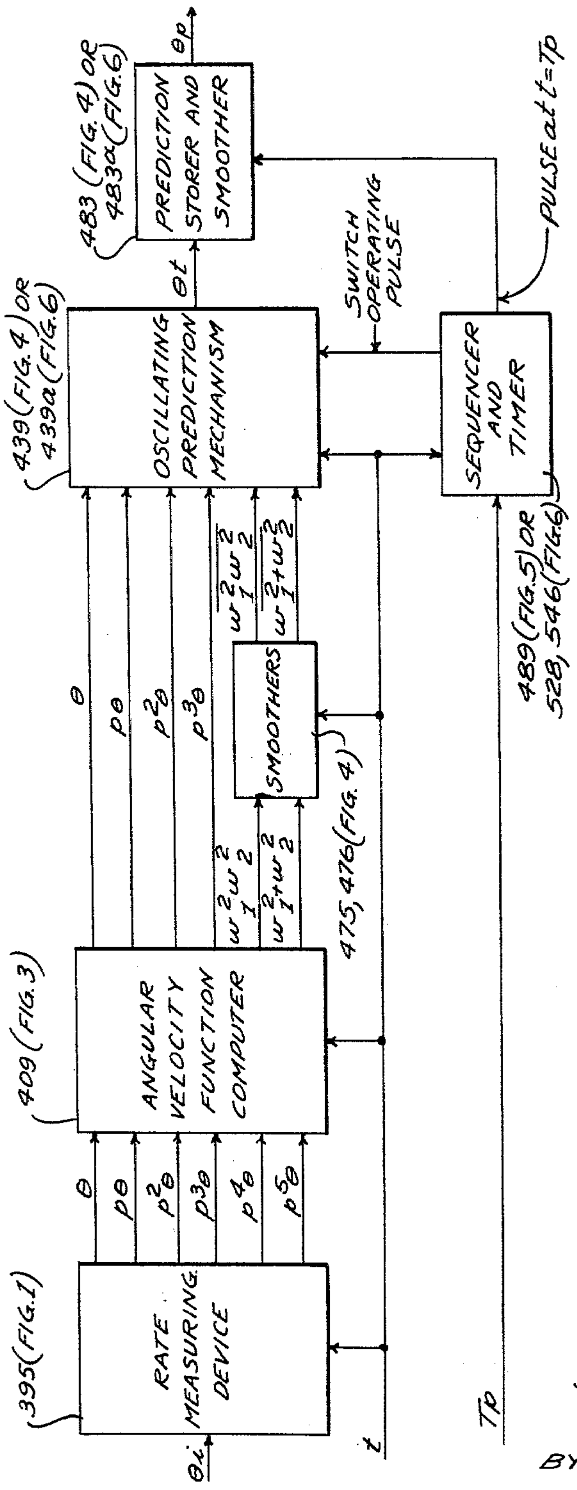
Figure 12:
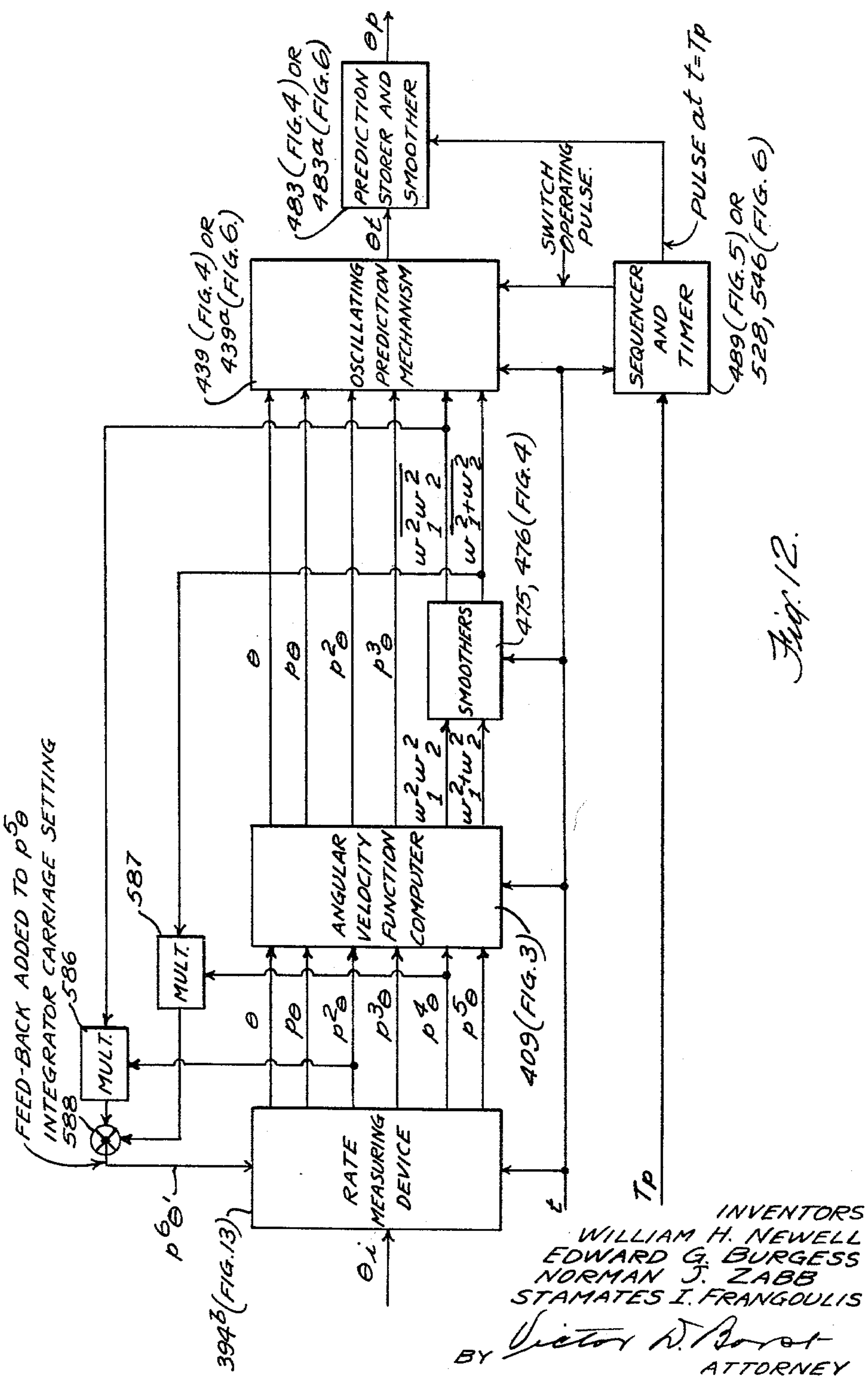
Figure 13:
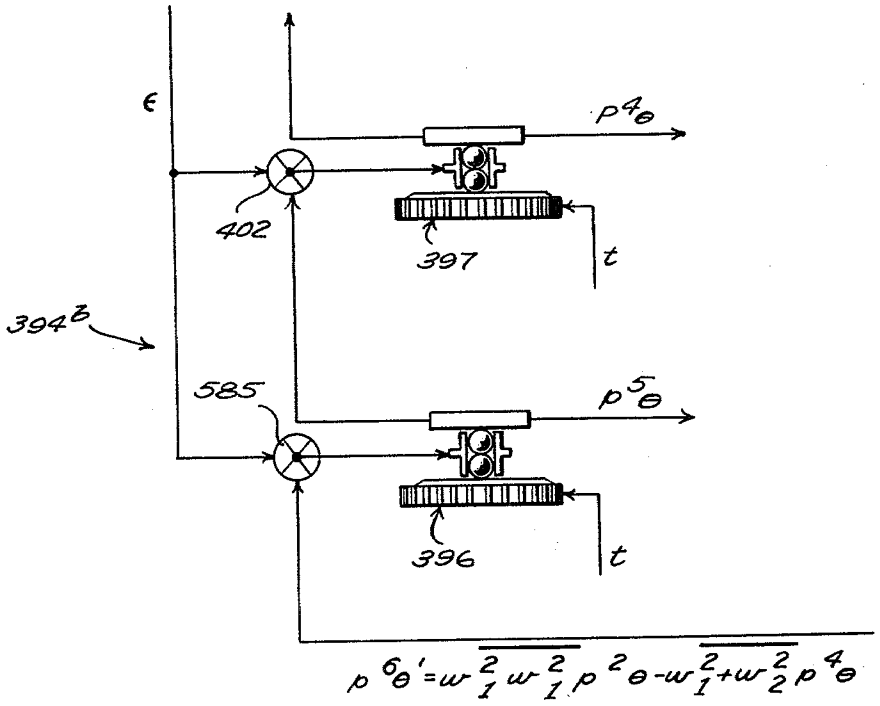
Figure 14:
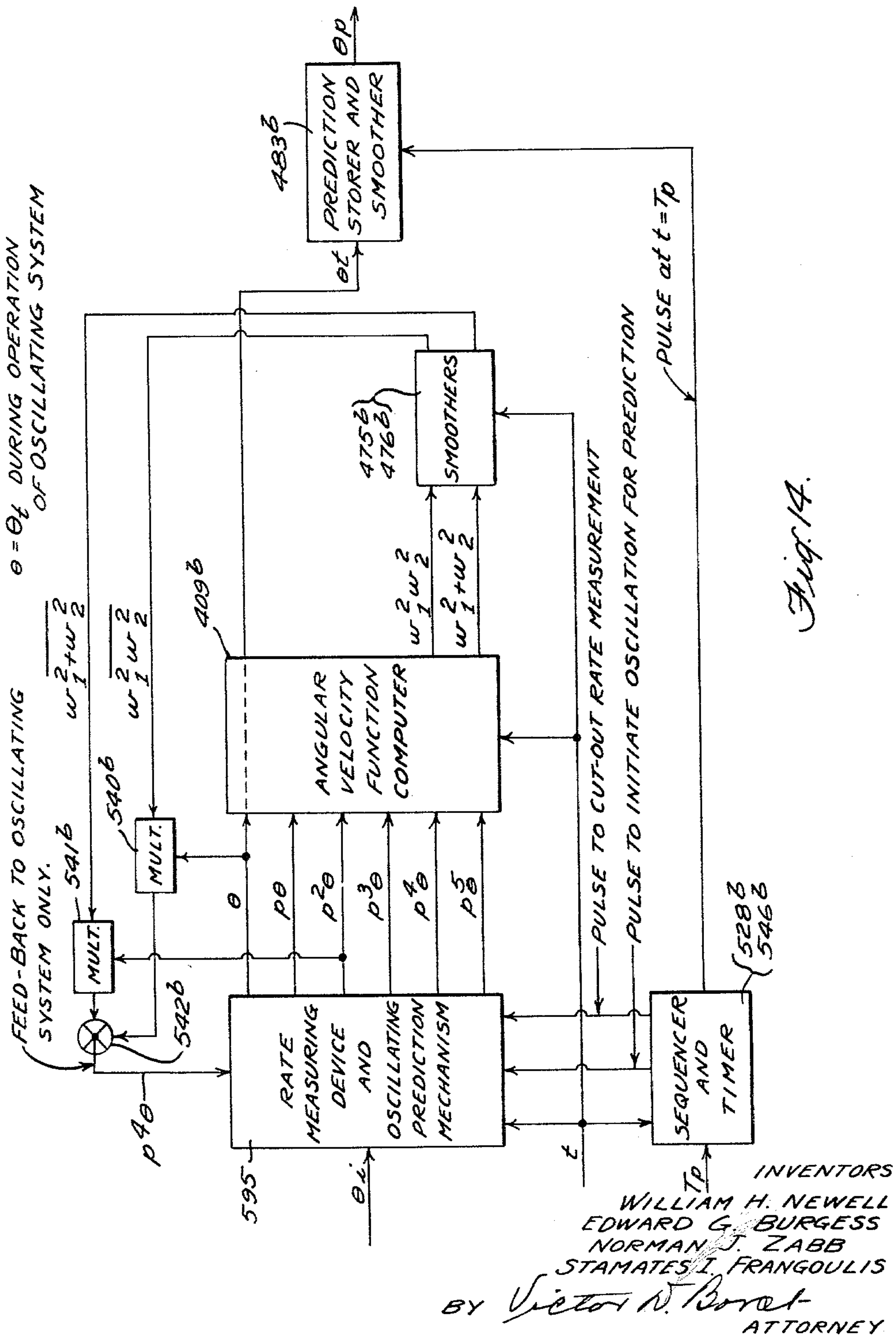
Figure 15:
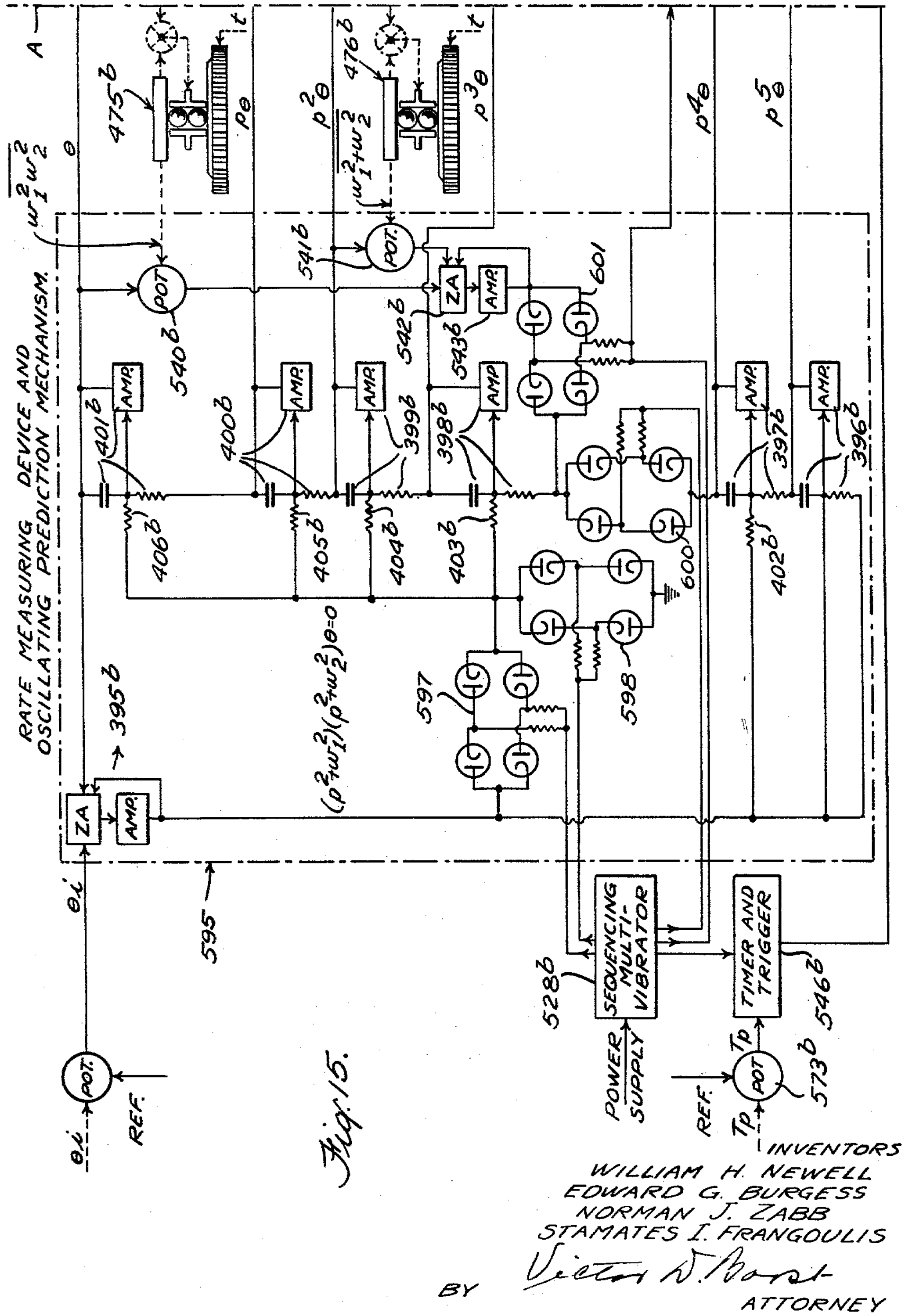
Figure 16:
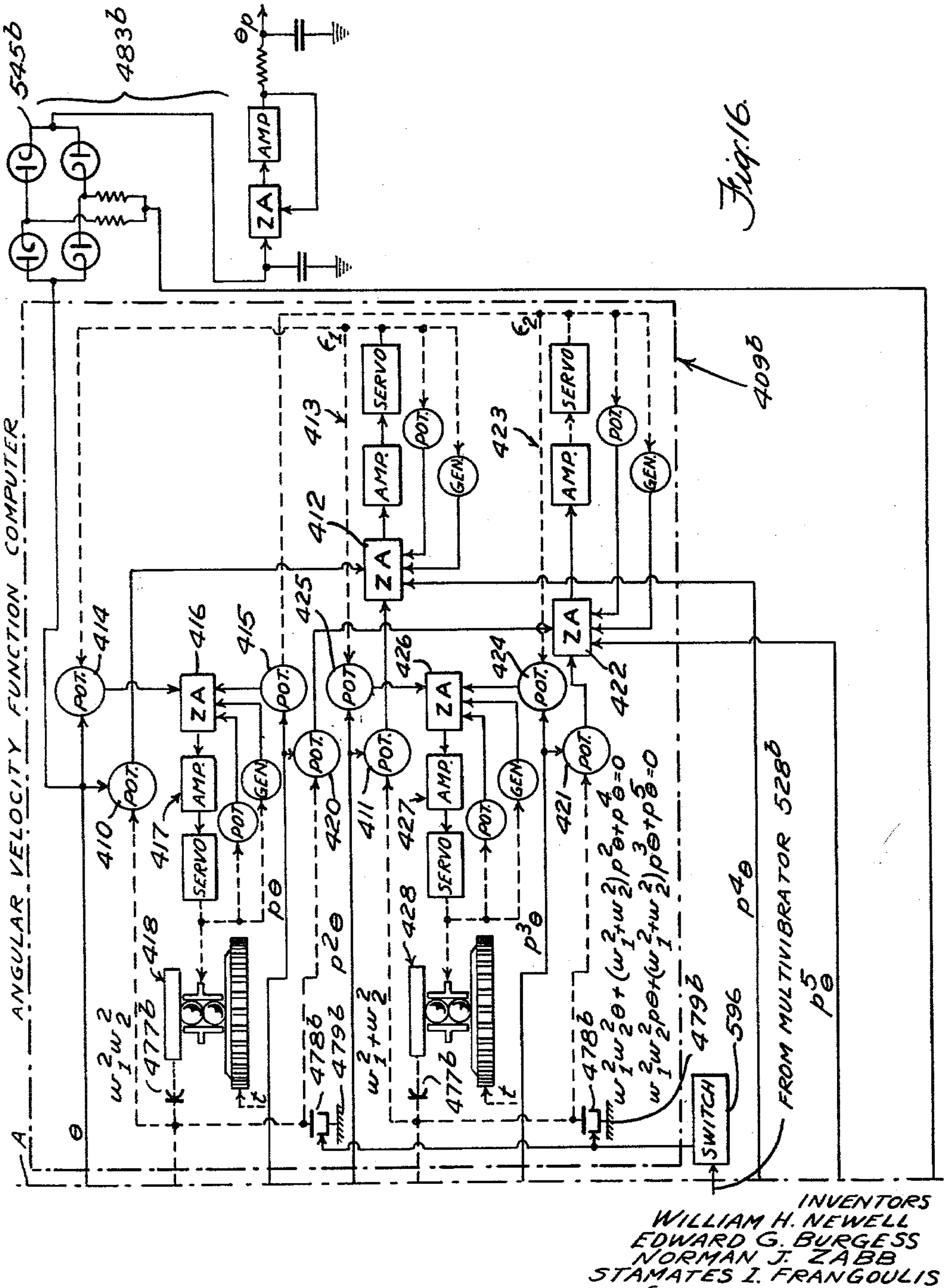
Figure 17:
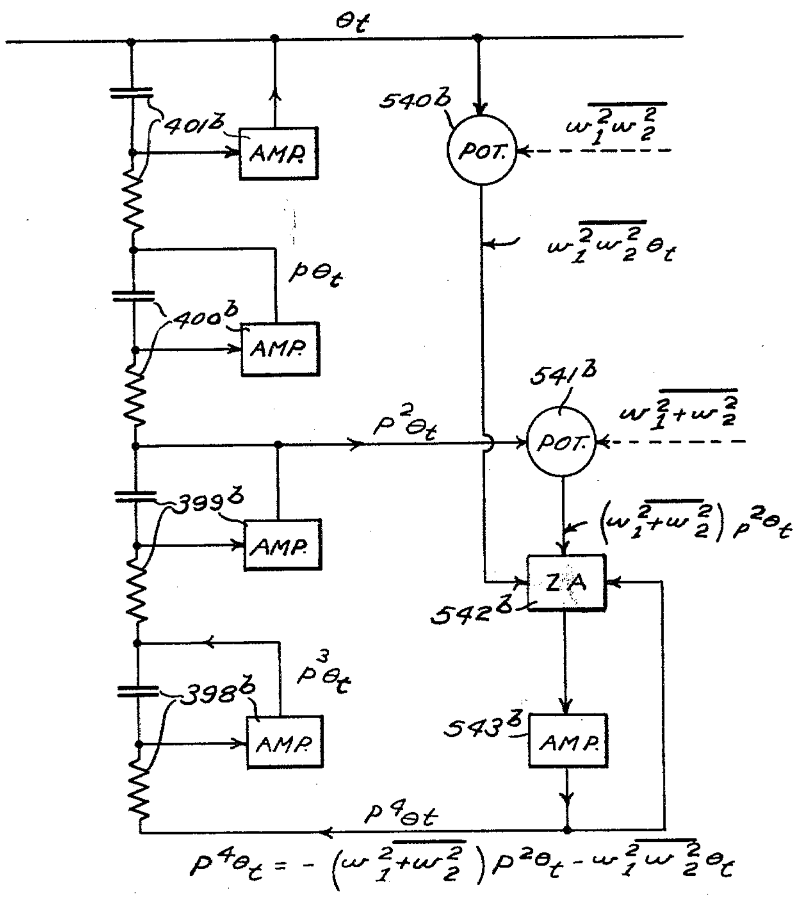

FIG. 4 is a diagram of a mechanical oscillating prediction mechanism adapted to employ the values obtained from the rate measuring device of FIG. 1 and the angular velocity function computer of FIG. 3, to determine in accordance with the more specific aspects of the invention, the predicted pitch angle and predicted deck level (heave) of a floating deck at a predicted future instant, the solid lines in said diagram indicating mechanical displacements and more specifically shaft rotations;

FIG. 5 is a diagram of a timing and control device for the oscillating prediction mechanism of FIG. 4, by which the different cycles and phases of operation are initiated and terminated at the proper time, the solid lines in said diagram indicating mechanical movements and the dotted lines electric impulses;

FIG. 6 is a diagram of an electrical oscillating prediction mechanism adapted to employ the values obtained from the rate measuring device of FIG. 2 and the angular velocity computer of FIG. 3, to determine in accordance with the more specific aspects of the invention, the predicted pitch angle and predicted deck level (heave) of a floating deck at a predicted future instant, the solid lines in said diagram indicating electric impulses and the dotted lines indicating mechanical displacements and more specifically shaft rotations;

FIG. 7 shows a form of electronic switch adapted to be employed as part of the oscillating prediction mechanism of FIG. 6;

FIG. 8 shows another form of electronic switch adapted to be employed as part of the oscillating prediction mechanism of FIG. 6;

FIG. 9 is a circuit diagram of a multivibrator and trigger device adapted to be employed as part of the oscillating prediction mechanism of FIG. 6 to control the timing and sequencing of the different phases of the cycle of operation of said mechanism;

FIG. 10 is a chart indicating the different cycles of operation of the oscillating prediction mechanism of FIG. 6 and the corresponding voltage wave and pulse characteristics emanating from different parts of the multivibrator and of the trigger circuit shown in FIG. 9;

FIG. 11 shows diagrammatically one manner in which the principal devices of the oscillating system shown in FIGS. 1, 3, 4, 5 and 6 may be assembled to predict the value of a varying quantity at a predetermined time instant;

FIG. 12 shows diagrammatically the manner in which the principal devices of the oscillating system shown in FIGS. 3, 4, 5 and 6 may be assembled in conjunction with the modified form of rate measuring device shown in FIG. 13 to predict the value of a varying quantity at a predicted time instant;

FIG. 13 is a diagram of a modified form of rate measuring device adapted to be employed as part of the oscillating system of FIG. 12;

FIG. 14 shows diagrammatically the general assembly of a modified form of oscillating prediction system in which the rate measuring device and the oscillating prediction mechanism are combined to permit part of the rate measuring circuit to be employed as part of the oscillating prediction circuit;

FIGS. 15 and 16 when combined along the dot and dash break lines A show the oscillating prediction system of FIG. 14 in greater detail, the solid lines indicating electric impulses or signals, the dotted lines indicating mechanical displacements such as shaft rotations; and FIG. 17 is a diagram of the oscillating prediction circuit of the oscillating prediction system of FIGS. 15 and 16 isolated from certain parts of the rate measuring device of said oscillating system, the solid lines indicating electric impulses or signals, the dotted lines indicating displacements, such as shaft rotations.

To predict the position of a ship's deck at the future instant of landing of an approaching plane, it is required that the time ahead when the plane is expected to land be predicted and then that the position of the deck at this time be predicted. This sequence of predictions is based on the assumption that the pilot has sole control of the plane speed and that the position of the deck at touchdown (the position of the deck where the plane can begin to land) is not preselected.

The time required by a plane to fly from its present position to its position at touchdown on the deck indicated herein by the symbol $T_p$ can be calculated by prediction time computer in the manner described in the aforesaid copending application. For computing the predicted pitch angle of the deck at the predicted time $T_p$ of landing indicated by the symbol, it is necessary to determine continuously the present pitch angle of the deck.

To supply continuously information on the magnitude of the present ship pitch angle, service of a stable element is required. This stable element could be of any well-known construction. For example, it could be one of the stable elements commonly employed in connection with firing control systems in warships. There is also the possibility that the stabilizer unit required in connection with the radar antenna drive could also be used to supply continuously the present pitch angle.

Having determined a value for the prediction time $T_p$, the second phase of the prediction problem is entered into, namely the deck tilt $P_p$ at the future time $T_p$. Consider first a ship at rest in still water. If now a moment should be applied about an athwartship axis through the center of gravity, some pitch angle, say P would result. Upon removal of this applied moment, the ship would oscillate in pitch about the athwartship axis with decreasing amplitude, the equation of motion being approximately $$I\ddot{P}+C\dot{P}+KP=0 \qquad (18)$$

where I is the effective longitudinal moment of inertia of the ship about the athwartship pitch axis, C is the damping moment coefficient due to skin friction and the like, K is the hydraulic restoring moment coefficient, $\ddot{P}$ is the second derivative of the pitch angle, with respect to time and $\dot{P}$ is the first derivative of the pitch angle with respect to time. Now the period of this oscillation is the pitching period of the ship and is equal to $$T=\frac{2\pi}{w_{np}}=\frac{2\pi}{\sqrt{\frac{K}{I}-\frac{C^2}{4I^2}}}$$

where $w_{np}$=natural angular frequency of pitch. However, when the ship is in a seaway, the equation of motion (18) becomes $$I\ddot{P}+C\dot{P}+KP=F(t)$$

where $F(t)$ represents the pitch component of the moment applied to the ship by wave action. Now from general observation, it can be said that $F(t)$, although highly variable, will nevertheless at a given hour exhibit a frequency spectrum in which certain narrow bands of frequencies are predominant. From an analyzed recording of pitch angle of various type ships headed into the wind under different sea conditions over extended periods of time, it would be possible to obtain the frequency spectrum of the ship's pitching motion under the conditions existing at the time of the run. From this data, it would be noted that the frequencies of greatest amplitude would correspond to the natural pitch period of the ship, the periods at which the ship is encountering the particular wave systems running at the time, the period of ship roll and the period of heave. The last two periods mentioned would probably be of small import and are included only because of the fact that both rolling and heaving cause an induced pitch. Usually, but not always, there will be a single system of waves running. Furthermore, this system of waves will more often than not be running in nearly the same direction as the wind. Hence, the normal expectation during carrier landing operations is that the ship would be headed in a direction about opposite to that in which the waves are traveling. Considering that the usual period of ocean waves is in the range of 5 to 10 seconds, a ship speed of 25 knots would reduce these periods to the range of 1.8 to 5.5 seconds. It almost seems from these considerations that under such conditions, the only period to be seriously considered in pitch motion would be the natural pitch period. That is, a forming moment function of 2 second period would have to be of tremendous magnitude to appreciably affect the ship motion in pitch. However, a forcing function of 5 second period might well have an appreciable effect, and of course a longer period forcing function would have still greater influence. Functions having such longer periods would arise if the normal conditions outlined above did not hold—as for example, when the wind is opposite in direction to the sea and the ship is traveling with a following sea.

From the above discussion, it is evident that an exact solution for the equation of motion of the ship is not possible. However, the equation of motion may be represented with sufficient accuracy by the approximation $$I\ddot{P}+KP=F(t)=a\sin(wt+\phi)$$

where $F(t)$ is a sine function of unknown amplitude $a$, angular frequency $w$ and phase angle $\phi$. The solution of this differential equation is then of the form $$P=a_1 \sin (w_1t+\phi_1)+a_2 \sin (w_2t+\phi_2) \quad (20)$$

$w_1$ and $w_2$ being the unknown angular velocities and $\phi_1$ and $\phi_2$ the phase angles of the simple harmonic motions of which the pitch angle is assumed to be composed. This form, involving the six unknown parameters $a_1$, $a_2$, $w_1$, $w_2$, $\phi_1$ and $\phi_2$ therefore represents the time variations of pitch angle. Hence, if these six unknowns and variable parameters can be continuously determined and furthermore if a continuous value of prediction time $T_p$ is available, then the predicted pitch angle is $$P_p=a_1 \sin [w_1(t+T_p)+\phi_1] + a_2 \sin [w_2(t+T_p)+\phi_2] \quad (21)$$

The problem is now therefore reduced to the continuous determination of the six unknown and variable parameters noted above.

The prediction method of the present invention is essentially based on establishing an oscillating system whose differential equation of motion is $$(p^2+w_1^2)(p^2+w_2^2)\theta=0 \text{ or}$$
$$p^4\theta+(w_1^2+w_2^2)p^2\theta+w_1^2w_2^2\theta=0 \quad (85)$$

from which we obtain by differentiation, $$p^5\theta+(w_1^2+w_2^2)p^3\theta+w_1^2w_2^2p\theta=0 \quad (86)$$

where $p^n$ equals the differential operator $$\frac{d^n}{dt^n}(\ \ )$$

and $\theta$ equals pitch angle in terms of angular displacement of shaft. Equations 85 and 86 when integrated will give the basic formula for an oscillating system of two simple harmonic components in the form $$\theta=a_1 \sin (w_1t+\phi_1)+a_2 \sin (w_2t+\phi_2) \quad (20b)$$

similar to Equation 20 previously discussed. The Equations 85 and 86 are derived from Equation 20$b$ as follows:

$$p^4\theta=a_1w_1^4 \sin (w_1t+\phi_1)+a_2w_2^4 \sin (w_2t+\phi_2)$$
$$(w_1^2+w_2^2)p^2\theta=-a_1(w_1^4+w_1^2w_2^2) \sin (w_1t+\phi_1) -a_2(w_1^2w_2^2+w_2^4) \sin (w_2t+\phi_2)$$
$$w_1^2w_2^2\theta=a_1w_1^2w_2^2 \sin (w_1t+\phi_1)+a_2w_1^2w_2^2 \sin (w_2t+\phi_2)$$

By adding the quantities on the left side of the equations and the quantities on the right side of the equations (the latter quantities cancelling out to zero), Equation 85 will result.

If at an arbitrary time $t$, we set the system oscillating with initial conditions given by the rates of the quantity $\theta$, namely, $\theta_t$, $p\theta_t$, $p^2\theta_t$, etc., and arrange the system so that Equation 85 necessarily holds, then the output of the system will be given by Equation 20$b$. Therefore, the predicted pitch angle $\theta_{t+Tp}$ or $\theta_p$ will be given when the system has run for the interval $T_p$ from the starting point with all initial conditions set. Here it should be noted that the mechanism time scale can be made much faster than the actual time scale, so that many $\theta_p$ readings can be obtained. Thus we may obtain a series of discrete values of $\theta_p$ by repeatedly resetting the oscillating system to new sets of initial conditions. The resulting values of $\theta_p$ may be smoothed by well known methods to obtain a continuous output.

The prediction system just described consists essentially of three mechanisms, namely (1) rate measuring device for determining the rates of the quantity $\theta$, i.e. $\theta_t$, $p\theta_t$, $p^2\theta_t$ etc., (2) angular velocity function computer for determining $w_1^2w_2^2$ and $w_1^2+w_2^2$ and (3) oscillating prediction mechanism for determining the value $\theta_p$ from the quantities derived from the angular velocity function computer and the derivatives of $\theta_t$.

A mechanical form of rate measuring device 394 is illustrated diagrammatically in FIG. 1 in which the full lines indicate shaft rotations. This rate measuring device comprises a comparison differential 395 into which are fed the quantity $\theta_i$ corresponding to the present pitch angle obtained from the stable element 10, and the quantity $\theta_o$ or $\theta$ which is one of the outputs of the device, to obtain an error signal $\epsilon$ equal to $\theta_i-\theta_o$, this error signal being fed successively into a series of integrators 396, 397, 398, 399, 400 and 401 through successive stabilizing differentials 402, 403, 404, 405 and 406. By means of the arrangement described, there is obtained therefrom the output quantities $p^5\theta$, $p^4\theta$, $p^3\theta$, $p^2\theta$, $p\theta$ and $\theta$, as shaft rotations, the latter quantity constituting the zero derivative value of $\theta_i$ and being the same as $\theta_o$.

In connection with the rate measuring device of FIG. 1 described, it should be noted that $p^n\theta$ is not exactly equal to $p^n\theta_i$. An analysis of the deviations involved show how small and insignificant these deviations are.

$$\theta=\theta_o=\theta_i-\epsilon$$
$$K_1p\theta=K_1p\theta_i-(K_1p+1)\epsilon$$
$$K_1K_2p^2\theta=K_1K_2p^2\theta_i-(K_1K_2p^2+K_2p+1)\epsilon$$
$$K_1K_2K_3p^3\theta=K_1K_2K_3p^3\theta_i -(K_1K_2K_3p^3+K_2K_3p^2+K_3p+1)\epsilon$$
$$K_1K_2K_3K_4p^4\theta=K_1K_2K_3K_4p^4\theta_i -(K_1K_2K_3K_4p^4+K_2K_3K_4p^2+K_3K_4p^2+K_4p+1)\epsilon$$
$$K_1K_2K_3K_4K_5p^5\theta=K_1K_2K_3K_4K_5p^5\theta_i -(K_1K_2K_3K_4K_5p^5+K_2K_3K_4K_5p^4 +K_3K_4K_5p^3+K_4K_5p^2+K_5p+1)\epsilon$$
$$K_1K_2K_3K_4K_5K_6p^6\theta=K_1K_2K_3K_4K_5K_6p^6\theta_i -(K_1K_2K_3K_4K_5K_6p^6+K_2K_3K_4K_5K_6p^5 + \dots +K_5K_6p^2+K_6p)\epsilon=\epsilon$$

Here, the K's are constants associated with the integrator given by the subscript. Thus, if the integrator output is $p^{n-1}\phi$, the input is $K_np^n\phi$.

Furthermore, from the last equation of the set above $$\frac{\theta_o}{\theta_i}=\frac{K_2K_3K_4K_5K_6p^5+K_3K_4K_5K_6p^4+ \dots +K_5K_6p^2+K_6p+1}{K_1K_2K_3K_4K_5K_6p^6+K_2K_3K_4K_5K_6p^5+ \dots +K_5K_6p^2+K_6p+1}$$

Accordingly for aperiodic operation $$K_1K_2K_3K_4K_5K_6=K^6 \quad \text{and} \quad K_1=\tfrac{1}{6}K$$
$$K_2K_3K_4K_5K_6=6K^5 \quad K_2=\tfrac{2}{5}K$$
$$K_3K_4K_5K_6=15K^4 \quad K_3=\tfrac{3}{4}K$$
$$K_4K_5K_6=20K^3 \quad K_4=\tfrac{4}{3}K$$
$$K_5K_6=15K^2 \quad K_5=\tfrac{5}{2}K$$
$$K_6=6K \quad K_6=6K$$

Hence $$\frac{\theta_o}{\theta_i}=\frac{(Kp+1)^6-K^6p^6}{(Kp+1)^6}=1-\frac{K^6p^6}{(Kp+1)^6}$$
$$\epsilon=\theta_i-\theta_o=\theta_i\left(1-\frac{\theta_o}{\theta_i}\right)=\left[\frac{Kp}{Kp+1}\right]^6\theta_i$$

FIG. 2 is a diagram of a rate measuring device 394*a* which is an electrical equivalent of the mechanical rate measuring device 394 illustrated in FIG. 1, the solid lines in said diagram representing electric signals and specifically voltages proportional to the values of the quantities indicated. In this electric rate measuring device, there is provided an adding network 395*a* which has an input the quantity $\theta_i$ obtained from a stable element 10*a* and which corresponds to the comparison differential 395 of FIG. 1, integrating networks 396*a*, 397*a*, 398*a*, 399*a*, 400*a* and 401*a* corresponding to the integrators 396, 397, 398, 399, 400 and 401, respectively of FIG. 1, and stabilizing resistances or feed-back elements 402*a*, 403*a*, 404*a*, 405*a* and 406*a* corresponding to the stabilizing differentials 402, 403, 404, 405 and 406 respectively of FIG. 1. The input $\theta_i$ into the rate measuring device will be a voltage obtained by impressing the shaft rotation from the stable element as a slider movement upon a potentiometer, while a reference voltage is also impressed on the resistance of said potentiometer to obtain the output $\theta_1$ as a voltage proportional to said shaft rotation.

The potentiometer for this purpose is described more fully in the aforesaid copending application. The voltage outputs of the electrical rate measuring device of FIG. 2 are $p^5\theta$, $p^4\theta$, $p^3\theta$, $p^2\theta$, $p\theta$ and $\theta$.

FIG. 3 shows diagrammatically an angular velocity function computer 409 for obtaining the values of $\omega_1^2\omega_2^2$ and $w_1^2+w_2^2$, the solid lines indicating electric signals and specifically voltages and the dotted lines indicating shaft displacements. The inputs into this computer 409 are the outputs $p^5\theta$, $p^4\theta$, $p^3\theta$, $p^2\theta$, $p\theta$ and $\theta$ of the rate measuring device of FIGS. 1 or 2. If the outputs from the mechanical device of FIG. 1 are employed, these must be converted into corresponding voltages before they can be used in the angular velocity function computer of FIG. 3.

The computer of FIG. 3 is divided into two sections F and G. Section F mechanizes equation $$p^4\theta+(w_1^2+w_2^2)p^2\theta+w_1^2w_2^2\theta=\epsilon_1\rightarrow 0 \qquad (85a)$$

and section G mechanizes equation $$p^5\theta+(w_1^2+w_2^2)p^3\theta+w_1^2w_2^2p\theta=\epsilon_2\rightarrow 0 \qquad (86a)$$

The computer 409 of FIG. 3 employs a stabilizing feedback. For that purpose, there is formed the auxiliary quantity:

$$\mu=\epsilon_1^2+\epsilon_2^2$$

$$\frac{\partial\mu}{\partial(w_1^2w_2^2)}=2\epsilon_1\frac{\partial\epsilon_1}{\partial(w_1^2w_2^2)}+2\epsilon_2\frac{\partial\epsilon_2}{\partial(w_1^2w_2^2)}$$

$$\frac{\partial\mu}{\partial(w_1^2w_2^2)}=2\epsilon_1\theta+2\epsilon_2p\theta \qquad (87)$$

$$\frac{\partial\mu}{\partial(w_1^2+w_2^2)}=2\epsilon_1p^2\theta+2\epsilon_2p^3\theta \qquad (88)$$

The mechanism is designed so that the adjusting feedbacks are $$\frac{\partial\mu}{\partial(w_1^2w_2^2)}=-\frac{1}{k_1}\frac{d(w_1^2w_2^2)}{dt} \qquad (89)$$

$$\frac{\partial\mu}{\partial(w_1^2+w_1^2)}=-\frac{1}{k_2}\frac{d(w_1^2+w_2^2)}{dt} \qquad (90)$$

Referring to the angular velocity function computer 409 of FIG. 3 and especially to its section F, the input $\theta$ as a voltage is imposed on a potentiometer 410, having its slider adjusted by the mechanical output quantity $w_1^2w_2^2$ to produce an output voltage $w_1^2w_2^2\theta$. This latter voltage, the input voltage $p^4\theta$, and the voltage $$(w_1^2+w_2^2)p^2\theta$$

obtained from a potentiometer 411 as will be described are fed into an adding network 412 to obtain an output voltage corresponding to the error $\epsilon_1$ in Equation 85*a*. This voltage $\epsilon_1$ is amplified and converted into a shaft rotation by a servo follow-up control system 413 of the type described in the aforesaid copending application. This shaft displacement $\epsilon_1$ from the control system 413 is imposed upon a potentiometer 414 in conjunction with the input voltage $\theta$ to obtain an output voltage equal to $2\epsilon_1\theta$. This voltage $2\epsilon_1\theta$ and the voltage $2\epsilon_2p\theta$ obtained from the output of a potentiometer 415 in a manner to be described are fed to an adding network 416 to obtain a voltage output equal to $2\epsilon_1\theta+2\epsilon_2p\theta$. This latter quantity is converted into a corresponding shaft displacement by means of a servo follow-up control system 417 similar to the control system 413 and to the control system described more fully in the aforesaid copending application. The output of this control system 417 is a shaft displacement corresponding to the quantity $2\epsilon_1\theta+2\epsilon_2p\theta$ which is equal to $$\frac{\partial\mu}{\partial(w_1^2w_2^2)}$$

under the relationship (87) developed to obtain a stabilizing feedback. This partial differential is equal to $$-\frac{1}{k_1}\frac{d(w_1^2w_2^2)}{dt}$$

as indicated in the relationship (89) due to the selected design of the mechanism, and when this quantity is integrated in a unit 418, there results an output quantity $w_1^2w_2^2$ from the section F of the mechanism embodied in a shaft displacement.

The quantity $w_1^2+w_2^2$ is obtained from section G of the angular velocity function computer of FIG. 3 in a similar manner. For that purpose, the input $p\theta$ as a voltage is imposed on a potentiometer 420 having its slider adjusted by the mechanical output quantity $w_1^2w_2^2$ to produce an output voltage $w_1^2w_2^2p\theta$. This latter voltage, the input voltage $p^5\theta$, and the voltage $(w_1^2+w_2^2)p^3\theta$ obtained from a potentiometer 421 as will be described are fed into an adding network 422 to obtain an output voltage corresponding to the error $\epsilon_2$ in Equation 86*a*. This voltage $\epsilon_2$ is amplified and converted into a shaft displacement by a servo follow-up control system 423 similar to the unit 413. This shaft displacement $\epsilon_2$ is imposed upon the potentiometer 415 in conjunction with the input voltage $p\theta$ to obtain the voltage quantity $2\epsilon_2p\theta$ for supply to the adding network 416 as described, and is also imposed upon a potentiometer 424 in conjunction with the input voltage $p^3\theta$ to obtain an output voltage equal to $2\epsilon_2p^3\theta$. An input voltage $p^2\theta$ and the mechanical error displacement $\epsilon_1$ are imposed upon a potentiometer 425, and the output voltage $2\epsilon_1p^2\theta$ from said potentiometer and the output voltage $2\epsilon_2p^3\theta$ from the potentiometer 424 are added in an adding network 426 to produce the voltage quantity $2\epsilon_1p^2\theta+2\epsilon_2p^3\theta$. This latter quantity is converted into a corresponding shaft displacement by means of a servo follow-up control system 427 similar to the control system 413. The output of this control system 427 is a shaft displacement corresponding to the quantity $2\epsilon_2p^2\theta+2\epsilon_2p^3\theta$ which is equal to $$\frac{\partial\mu}{\partial(w_1^2+w_2^2)}$$

under the relationship (88) developed to obtain a stabilizing feedback. This partial differential is equal to $$-\frac{1}{k_2}\frac{d(w_1^2+w_2^2)}{dt}$$

as indicated in the relationship (90) due to the selected design of the mechanism, and when this quantity is integrated in a unit 428, there results an output quantity $w_1^2+w_2^2$ from the section G of the mechanism embodied in a shaft displacement. This quantity $w_1^2+w_2^2$ is fed into the potentiometer 411 in conjunction with the input voltage $p^2\theta$ to obtain the voltage quantity $(w_1^2+w_2^2)p^2\theta$ for supply to the adding network 412, and is also fed into the potentiometer 421 in conjunction with the input voltage $p^3\theta$ to obtain an output voltage corresponding to the quantity $(w_1^2+w_2^2)p^3\theta$ for supply to the adding network 422, as already described.

The quantities $w_1^2w_2^2$ and $w_1^2+w_2^2$ obtained as the mechanical outputs of the angular velocity function computer 409 of FIG. 3 are adapted to be employed in an oscillating prediction mechanism for determining the value $\theta_p$ from these outputs.

FIG. 4 shows a mechanical oscillating prediction mechanism 439 adapted to apply to the mechanism as initial settings, at spaced time intervals during the predicted time period $T_p$ of the run, the angular velocity functions obtained from the computer 409 (FIG. 3) and the quantities $\theta$, $p\theta$, $p^2\theta$, and $p^3\theta$ obtained from the rate measuring device 394 (FIG. 1) and to be operated with said settings through oscillating cycles following the equational relationships (85) and (86) but at a speeded time scale for $T_p$. From these oscillating cycles, a succession of predicted values for the pitch angle $\theta_p$ at the predicted time $T_p$, to the speeded time scale, is obtained. These predicted values are close to the value $\theta_p$ desired, and since the known initial conditions for the oscillating cycle are reset in the system for the successive cycles, the predictions become successively more accurate, as the predicted time $T_p$ approaches zero. The predicted values therefore approach successively closer to the value of the desired pitch angle $\theta_p$.

In the diagram of the oscillating prediction mechanism 439 shown in FIG. 4, the solid lines indicate mechanical displacements and more specifically shaft rotations. This mechanism comprises in general four initial value resetting devices 440, 441, 442 and 443, each adapted to store up mechanical quantities during each of a succession of cycles during a $T_p$ run and to release or unload them after each cycle, so as to set up at the beginning of each integration cycle the quantities $p\theta$, $p^2\theta$, $p^3\theta$ and $p^4\theta$ as initial values for integration through successive integrators 447, 446, 445 and 444 constituting part of the oscillating prediction mechanism 439. All of these devices 440, 441, 442 and 443 are similar in certain respects, so that devices 440 alone will be described.

The storing and unloading device 440 comprises a differential 450 with an input $\theta$ which is one of the present or current mechanical outputs of the rate measuring device 394 (FIG. 1), another input which is designated as $\theta_t$ indicating the pitch angle at a future time $t$, and an output equal to the difference between these inputs and connected to a heart cam 451 of the type well-known for storing and releasing rotational displacements at time intervals. Such heart cams are constructed in the well-known manner, to cause the reaction of spring-pressed followers thereagainst, to displace in the absence of restraint the cams and the followers relatively into centered position with the followers in the valleys of the cams.

The heart cam 451 has a follower secured to a shaft 452 having a locking clutch connection 453 to a fixed frame 454 and carrying a heart cam 455. The follower of the heart cam 455 is connected to an element of a clutch 456 and to a heart cam 457 having its follower spring-pressed during certain phases towards the cam 457 and controlled by a solenoid 458. The other element of the clutch 456 is rigidly connected by an unloading connector 460 to an input of a differential 461 and is also connected to one element of another locking clutch 462, the other element of which is anchored to a fixed frame 463. The other input into the differential 461 comes from the output of the integrator 447 and the output from said differential is fed as an input into the differential 450.

In the operation of a storing and unloading cycle of the device 440, when a storing phase of said cycle is beginning, an integrating cycle with values initially set for integration as a result of a previous unloading phase is also just beginning. Under these conditions, the clutches and heart cams of the device are in the positions shown in FIG. 4. During this initial storing phase, the input into the differential 450 will be $\theta$, while the other input will be $\theta_t$, and the integrators 444, 445, 446 and 447 will have their timing discs just beginning to run. The output of the differential 450 will cause the heart cam 451 to rotate, and since the clutch 453 is open or disengaged, the follower of said heart cam will move with said cam and will move the heart cam 455 therewith. The clutch 456 is disengaged, so that the follower of the heart cam 455 moves with said cam and the heart cam 457 is rotatively displaced in relation to its follower and without intreference therefrom, since the latter follower is withdrawn into inactive position away from said cam 457 by energization of the solenoid 458. The angular displacement of the heart cam 457 corresponds to the differences in the inputs into the differential 450 or $\theta_t-\theta=J\theta_t$.

During the storing phase described, the clutch 456 is disengaged and the clutch 462 is in engaged or locked position, so that the connector 460 is locked against rotation. At the end of the storing interval, and at the end of the contemporaneous integrating cycle, the timing discs of the integrators 444, 445, 446 and 447 are shut-off, so that the integration cycle is ended and at the same time, or a short time thereafter, the clutches 453 and 456 are closed or engaged, the clutch 462 is unlocked or disengaged, and the solenoid 458 is deenergized or released, thereby causing the follower of the heart cam 457 to be spring-pressed against said cam, and said cam to be centered with respect to its follower. This causes the heart cam 457 to rotate to its original setting an amount which corresponds to the accumulated displacement thereof up to the period just prior to the shift in the conditions of the clutches 453, 456 and 462 and which is designated by the quantity $J\theta_t$. With the clutch 456 now engaged and the clutch 462 unlocked, the return or unloading movement of the heart cam 457 is transmitted through the connector 460 to an input of the differential 461 and this causes the output of said differential to rotate an amount equivalent to the input value $\theta$ of the differential 450 just prior to the unloading cycle.

The mechanism is set up in assembly, so that the cams and the integrator carriages are in zero or centered position when the two inputs to each of the differentials 450 and the other corresponding differentials 465, 466 and 467 to be described are equal to zero. Under these conditions of assembly, during an integration period, while the value of the input into the differential 461 through the connector 460 is clamped or locked at a value $J\theta_t$, the output of the integrator 447 fed into the other input of the differential 461 will be $\theta_t-J\theta_t$, so that the output of the differential 461 fed into the differential 450 to $\theta_t$ and at the end of the speeded period $T_p$ will be equal to one of the predicted values $\theta_p$ to be sampled. When the displacement which has been storing up in the cam 457 is unloaded through the connector 460 into the differential 461 in the manner described, the output of the differential 461 by this unloading action will, because of the initial zero setting at assembly, be equal to the input $\theta$ of the differential 450 just prior to said unloading action, as already described.

The unloading movement of the heart cam 457 moves the follower of the heart cam 455 relative to said heart cam 455, since said heart cam 455 is locked in position through clutch 453, while the follower of the heart cam 451 remains stationary, and the heart cam 451 is permitted to rotate.

As soon as the unloading is completed, the clutches 462, 456 and 453 are returned to the conditions shown in FIG. 4, and the solenoid 458 is energized to release the follower of the heart cam 457 from the influence of said cam. This operation restores the follower of the heart cam 451 into centered position with respect to said cam, thereby causing the heart cam 455 to move into corresponding position, the follower of the heart cam 455 to be centered with respect to said cam, and the heart cam 457 to be moved into corresponding position. The device 440 is thereby set in the condition shown in FIG. 4 for the next storing and unloading cycle.

The storing and unloading devices 441, 442 and 443 operate in certain respects in a manner similar to the unit 440 described, with inputs $p\theta$, $p^2\theta$ and $p^3\theta$ from the rate measuring device 394 (FIG. 1) feeding into differentials 465, 466 and 467 respectively of said devices, corresponding to the differential 450 of the unit 440, to obtain the unloaded quantities $Jp\theta_t$, $Jp^2\theta_t$ and $Jp^3\theta_t$. These unloaded quantities constitute changes in the values of $p\theta_t$, $p^2\theta_t$ and $p^3\theta_t$ with respect to the values $p\theta$, $p^2\theta$ and $p^3\theta$ respectively, just prior to the unloading operation, i.e. $J_p\theta_t=p\theta_t-p\theta$; $J_p{}^2\theta=p^2\theta_t-p^2\theta$ and $J_p{}^3\theta_t=p^3\theta_t-p^3\theta$. The storing and unloading devices 441, 442 and 443 include differentials 468, 469 and 470 respectively having one set of inputs arranged to receive the unloaded quantities $Jp\theta_t$, $Jp^2\theta_t$ and $Jp^3\theta_t$, having another set of inputs for receiving quantities from the output of preceding integrators and having outputs arranged to adjust the carriages of the integrators 447, 446 and 445 with revised initial values $p\theta$, $p^2\theta$ and $p^3\theta$ respectively at the beginning of each integration cycle. Immediately after each unloading cycle, the initial resetting quantity imposed upon the carriage of the integrator 447 is equal in value to the input $p\theta$ of the differential 465 just prior to the unloading cycle; the initial resetting quantity imposed upon the carriage of the integrator 446 is equal in value to the input $p^2\theta$ of the differential 466 just prior to the unloading cycle; and the initial resetting quantity imposed upon the carriage of the integrator 445 is equal in value to the input $p^3\theta$ of the differential 467 just prior to the unloading cycle.

After the output of the differential 461 is fed into the differential 450 and the outputs of the differentials 468, 469 and 470 are imposed upon the carriages of the integrators 447, 446 and 445 respectively for initial value resetting purposes, the timing discs in the integrators 444, 445, 446 and 447 are started to initiate the integrating cycle. These discs are rotated at increased speeds through a number of revolutions corresponding to the value of $T_p$ but for an actual period which is a small fraction of the actual time $T_p$. During this integrating cycle, the angular velocity functions $w_1^2w_2^2$ and $w_1^2+w_2^2$ are fed into the system and combined with the values of $p^2\theta_t$ and $\theta_t$ to obtain the value $p^4\theta_t$ for introduction into the carriage of the first integrator 444.

It is desirable that the angular velocity functions $w_1^2w_2^2$ and $w_1^2+w_2^2$ be smoothed out to the values indicated as $\overline{w_1^2w_2^2}$ and $\overline{w_1^2+w_2^2}$ before these functions are fed into the oscillating prediction mechanism shown in FIG. 4. For that purpose, there is provided an integrator type follow-up unit 475 for smoothing the quantity $w_1^2w_2^2$ coming from the output of the angular velocity function computer 409 (FIG. 3) to the value $\overline{w_1^2w_2^2}$ and a similar integrator type follow-up unit 476 for smoothing the quantity $w_1^2+w_2^2$ also derived from said computer to the value $\overline{w_1^2+w_2^2}$. Each of these units 475 and 476 comprises an integrator having its carriage set from the output of a differential into which the angular velocity function to be smoothed out is fed and having its output returned as an input into said differential. The operational performance of the integrator unit 475 is as follows:

$$w_1^2w_2^2-\overline{w_1^2w_2^2}=k_1 d\frac{(\overline{w_1^2w_2^2})}{dt}=k_1(\dot{\overline{w_1^2w_2^2}})$$

where $k_1$ equals the constant of the integrator. Employing operational notation, in which $$p=\frac{d(\ )}{dt}$$

we obtain $$\overline{w_1^2+w_2^2}=\frac{w_1^2+w_2^2}{k_1p+1}$$

$$\frac{1}{k_1p+1}$$

constituting the performance operator of the unit 475.

Similarly, it is seen that $$\overline{w_1^2+w_2^2}=\frac{w_1^2+w_2^2}{k_2p+1}$$

is the performance equation of the integrator unit 476, $k_2$ being the constant of the integrator in said unit.

It is also desirable that the quantities $\overline{w_1^2w_2^2}$ and $\overline{w_1^2+w_2^2}$ be locked in value during the integrating prediction period, so that no change in these quantities can occur during this period and the oscillating angle prediction mechanism will be concerned with constant angular velocities $w_1$ and $w_2$. For that purpose, each of the output connections from the integrator units 418 and 428 in the angular velocity computer 409 (FIG. 3) has a clutch 477 which will slip when the driven element of the clutch is locked against rotation. For locking this driven clutch element, there is provided a second clutch 478 one element of which is connected to the driven element of the clutch 477, the other element being secured to a fixed frame 479. At the proper time, after the initial values have been set into the oscillating prediction mechanism of FIG. 4 and before the integration prediction cycle starts, the clutches 478 (FIG. 3) are closed or engaged, thereby locking the driven elements of the clutches 477 and fixing the inputs into the corresponding integrator type smoothing units 475 and 476 (FIG. 4). At the same time, the drives of the integrator discs in these units 475 and 476 are stopped.

The following differential equation $$p^4\theta_t=-(\overline{w_1^2+w_2^2})p^2\theta_t-\overline{w_1^2w_2^2}\theta_t \qquad (85b)$$

derived from relation (85) must be solved for the quantity $\theta_t$ by the oscillating prediction mechanism of FIG. 4 during the integration cycle. For that purpose, the output $\overline{w_1^2w_2^2}$ from the smoothing unit 475 is fed into a multiplier 480 in conjunction with the quantity $\theta_t$ to obtain the product $(\overline{w_1^2w_2^2})\theta_t$. At the same time, the output $\overline{w_1^2+w_2^2}$ from the smoothing unit 476 is fed into a multiplier 481 in conjunction with the quantity $p^2\theta_t$ to obtain the product $(\overline{w_1^2+w_2^2})p^2\theta_t$. The two products described are then fed into a differential 482 to obtain the output quantity $p^4\theta_t$ according to relation (85*b*). This quantity $p^4\theta_t$ is set in the carriage of the first integrator 444 of the oscillating prediction mechanism and then integrated through successive stages by means of the integrators 444, 445, 446 and 447 to obtain the quantity $\theta_t$. The successive integrations take place and are completed with the drive discs of the integrators 444, 445, 446 and 447 speeded up, so that the discs make the required number of revolutions corresponding to the period $T_p$ in a shortened time. The sampled value of $\theta_t$ obtained thereby will approximate the true predicted value of $\theta_p$ required and will get closer thereto during succeeding oscillating prediction cycles, until the predicted instant of landing has been reached. Since the value of $T_p$ becomes progressively smaller as the predicted instant of landing approaches, the time required for each integration and prediction cycle becomes correspondingly smaller.

The quantity $\theta_t$ is sampled during each integration cycle, as hereinafter described, at the particular time $t=T_p$. At this instant, $\theta_t=\theta_{T_p}=\theta_p$, which is the predicted angle required. On successive integration cycles the magnitude of $T_p$ will decrease in successive steps by an amount which is approximately equal to the actual time required for the preceding integration cycle. The sequential values of $\theta_p$, obtained by sampling $\theta_t$ at $t=T_p$ on each successive integration cycle, should all be equal in value provided the conditions on which the prediction is based remain unchanged. Normally, however, these conditions will change and accordingly the sequence of values of $\theta_p$ will differ by small amounts.

The output $\theta_t$ at the end of a speeded $T_p$ period in each integration cycle is equal approximately to the predicted $\theta_p$, but may be changed in value by the next integration cycle because of the new initial values set into the carriages of the integrators 445, 446 and 447 and because of the time factor $T_p$. Therefore, to assure a substantially continuous output of the predicted $\theta_p$ quantity without material variations, the quantity $\theta_t$, varying during the integration cycle, is stored during this cycle by means of a storing, sampling and smoothing device 483, is sampled at the end of the speeded $T_p$ period when $\theta_t$ approximates $\theta_p$ in value, and is smoothed out for substantially continuous delivery by said device. For the purpose of obtaining a continuous $\theta_p$ output from a sequence of discrete values of $\theta_p$, the storing, sampling and smoothing device 483 is used, which is similar to the initial value resetting device 440. This device 483 comprises a shaft connected to the output of the differential 461 to carry the quantity $\theta_t$, a differential 450' with the input $\theta_t$, the input $\theta_p$ and an output equal to the difference between these inputs and connected to a heart cam 451' for storing and releasing rotational displacements at time intervals. The heart cam 451' has a follower secured to a shaft 452' having a locking clutch connection 453' to a fixed frame 454' and carrying a heart cam 455'. The follower of the heart cam 455' is connected to an element of a clutch 456' and to a heart cam 457' having its follower spring-pressed during certain phases towards the cam 457' and controlled by a solenoid 458'. The other element of the clutch 456' is rigidly connected by an unloading connector 460' to the input of the differential 450' and to the input of an integrator type smoothing unit 488 and is also connected to one element of another locking element 462', the other element of which is anchored to a fixed frame 463'.

The storing, sampling and smoothing device 483 is shown in FIG. 4 at the instant immediately after the value of $\theta_p$ has been sampled. At that instant, the clutches 453' and 456' are unlocked or disengaged, the clutch 462' is locked or engaged, the heart cams 451', 455' and 457' are in centered position, and the solenoid 458' is energized, so that the follower controlled by said solenoid is withdrawn from the heart cam 457'. During integration while the clutches 453', 456' and 462' are in the position shown in FIG. 4, the quantity $\theta_t$ is being stored in the heart cam 457' by angular displacement thereof, through the operation of the heart cams 451' and 455'. At the end of a speeded $T_p$ integration period, the clutches 453' and 456' are locked or engaged, the clutch 462' is disengaged or unlocked and the solenoid 458' is deenergized to permit the follower of the heart cam 457' to be spring-pressed against said cam 457' into centered position with respect to said follower. This operation unloads the stored sample quantity $\theta_p$ through the engaged clutch 456', through the connector 460' and into the integrator type smoothing unit 488, where it is smoothed to produce the quantity $\theta_p$. After the sampling operation described, the clutches 453', 456' and 462' are restored to the condition shown in FIG. 4.

FIG. 5 shows diagrammatically a timing and control arrangement for the angular velocity computer 409 (FIG. 3) and for the oscillating prediction mechanism 439 of FIG. 4, by which the different cycles and phases of operation are initiated and terminated at the proper time, the solid lines indicating mechanical movements and the dotted lines electrical impulses. This arrangement comprises a $T_p$ storing and unloading device 489 similar to the $J_p{}^n\theta_t$ storing and unloading devices of the prediction mechanism 439 of FIG. 4 and including heart cams 490, 491 and 492, the latter being solenoid controlled, a coupling clutch 493, locking clutches 494 and 495 and a differential 496. The $T_p$ storing and unloading device 489 is shown in condition at the beginning of the $J_p{}^n\theta_t$ storing cycle of the oscillating prediction mechanism 439 of FIG. 4 and at the beginning of the integrating cycle operating with the settings of the quantities obtained from the previous $J_p{}^n\theta_t$ storing and unloading cycle. During this phase of the operation of the device 489, the quantity $T_p$ (predicted time) derived from the output of the time prediction computer disclosed in the aforesaid copending application, is continuously being fed into the differential 496 to cause corresponding rotational displacement of the heart cam 492, while its controlling solenoid 499 is energized to withdraw the follower of said cam into inoperative position. At a proper time, after the previous integrating cycle has been completed, the clutches 493, 494 and 495 are reversed from the condition shown in FIG. 5 and the solenoid 499 is deenergized, causing thereby the follower of the heart cam 492 to be spring-pressed against said heart cam and said heart cam to be centered with respect to said follower. The resulting rotative return movement of the heart cam 492 is transmitted through an unloading connector 497 as another input of the differential 496 and also to an input of a second differential 498. The shaft of a motor 500 connects through a speed reduction gearing (not shown) and through a clutch 501 into the other input side of the differential 498 to feed the quantity $t$. A brake 502 is mounted for action upon the shaft of the motor 500 and a connection 503 leads from the output of said motor to driving the timing discs on the integrators 444, 445, 446 and 447 of the oscillation prediction mechanism of FIG. 4.

Connected to the driven side of the clutch 501 is a heart cam 504 having a spring-pressed follower controlled from a solenoid 505. The output of the differential 498 operates a switch 506 which controls the circuit of this solenoid 505, the circuit of the motor 500, and the operation of the brake 502 and also controls the clutches 493, 494 and 495 in the $T_p$ storing and unloading device 489 of FIG. 5, and the clutches 453, 456 and 462 and the solenoids 458 of the heart cams 457 in all the $J_p{}^n\theta_t$ storing and unloading devices 440, 441, 442 and 443 of the mechanism of FIG. 4. A motor 507 driving the timing discs in the smoothing integrator units 475 and 476 of FIG. 4 and a brake 508 for the shaft of said motor and the clutches 478 (FIGS. 3 and 5) for locking the angular velocity function quantities at appropriate times are also controlled from the switch 506. This switch 506 serves when closed, to effect operations of the motor 500 and release of the brake 502 and to energize the solenoid 505 by closing the circuits of these devices, and serves by appropriate electrical control expedients such as relays and the like, well-known in the art, to effect when the switch 506 is opened and/or closed, switch-overs in the clutches 493, 494 and 495 of the $T_p$ storing and unloading device 489 of FIG. 5 and in the clutches 453, 456 and 462 of the $J_p{}^n\theta_t$ storing and unloading devices 440, 441, 442 and 443 of FIG. 4, control of the circuit or circuits of the solenoids 458 of the heart cams 457 in said $J_p{}^n\theta_t$ storing and unloading devices, control of the circuit of the brake 508 and of the motor 507 driving the timing discs of the smoothing integrator units 475 and 476 in the mechanism of FIGS. 4 and 5, switch-overs in the clutches 478 (FIGS. 3 and 5) for locking the angular velocity function quantities at appropriate times, switch-overs in the clutches 453', 456' and 462' of the sampling device 483 of FIG. 4 and control of the circuit of the solenoid 458' in said sampling device. If desired the switch 506 may operate to open one circuit or set of circuits and close another circuit or set of circuits alternately to control the different devices therefrom. The particular electrical hook-up between the switch 506 and the different devices it controls is well within the compass of those skilled in the art, and need not be described herein with any further particularity.

In operation, while the device 489 is storing $T_p$ displacement, the timing system is in the condition shown in FIG. 5, with the motor 500 operating, so that the integrators 444, 445, 446 and 447 in the oscillating prediction mechanism of FIG. 4 are operating; the clutch 501 is engaged, so that drive from the motor 500 is transmitted to the $t$ input of the differential 498; the other $T_p'$ input of the differential 498 is locked into the unloaded condition of the previous cycle by the engaged clutch 495; the solenoid 505 is energized, so that the heart cam 504 is free to rotate with the $t$ input to the differential 498; the device 489 is going through the phase of loading up the displacement of $T_p$ input through the differential 496 for the next integrating cycle; the clutches 478 for locking the angular velocity function quantities fed into the mechanism of FIG. 4 periodically are engaged; so that the mechanism of FIG. 4 is operating with these quantities constant; the motor 507 for driving the drive discs of the smoothing integrator units 475 and 476 of FIG. 4 is not operating and the brake 508 for said motor 507 is applied; the clutches 453', 456' and 462' in the sampling device 483 are in the condition shown in FIG. 4 and the solenoid 458' is energized to render the follower for the heart cam 457′ inoperative, so that the $\theta_t$ output quantity is being stored. The switch 506 is such as to be closed when there is a difference in the inputs to the differential 498, and since the $t$ input starts operating from a zero setting, this difference becomes progressively smaller, until the $t$ input of said differential is equal to the other input $T_p'$ which has been unloaded from the device 489 and locked by the clutch 495. The input $t$ to the differential 498 is operated at a speeded rate to turn through a number of revolutions equivalent to the predicted time $T_p$ within a period which is a small fraction of the actual $T_p$ period. When the $t$ input to the differential 498 has made the required number of turns equivalent to the other $T_p'$ input to said differential, the switch 506 opens, and this opens the circuit of the motor 500, applies the brake 502, disengages the clutch 501, deenergizes the solenoid 505, so that the follower of the heart cam 504 is permitted to be spring-pressed against said heart cam, thereby causing said heart cam to be centered with respect to said follower and the $t$ input to the differential to be adjusted back to its zero setting. At the same time, the clutches 478 (FIGS. 3 and 5) for locking the angular velocity function quantities fed into the mechanism of FIG. 4 are disengaged, the brake 508 on the motor 507 driving the timing discs of the smoothing integrator units 475 and 476 in said mechanism is released, the motor 507 is started, the clutches 453′, 455′ and 462′ in the sampling device 483 of FIG. 4 are switched over from the condition shown, the solenoid 458′ in said sampling device is deenergized to sample the $\theta_t$ output, the clutches 493, 494 and 495 in the timing system of FIG. 5 are switched over from the $T_p$ storing condition shown to a $T_p'$ unloading condition and the solenoid 499 of the heart cam 492 is deenergized to permit the follower of said cam to be released into spring-pressed position to center the cam and thereby return it into original position. Because of the disengagement of the locking clutch 495, this cam centering operation causes unloading of the displacement of the heart cam 492 to the connector 497 through the engaged clutch 493 and imposes the resulting unloaded displacement $T_p'$ as inputs upon the differentials 496 and 498. The difference between the zero $t$ setting and the unloaded quantity $T_p'$ imposed upon the differential 498, closes the switch 506 after a delay period sufficient to permit the full unloading of the input quantity $T_p'$ into said differential and the resetting of the other input $t$ to said differential to zero and thereby releases the brake 502, starts the motor 500, engages the clutch 501, energizes the solenoid 505, so that the follower of the heart cam 504 is withdrawn into inoperative position and reverts the control elements in the mechanism of FIG. 4 back to the condition shown. This delay in the closing of the switch 506 may be effected through a time delay relay built into said switch, this relay being operative when the switch is being closed but inoperative when the switch is being opened, to effect instantaneous opening of said switch immediately upon the $t$ input of the differential 498 of FIG. 5 attaining the value of the other input $T_p'$ into said differential. The cycle is then repeated as described.

FIG. 6 shows diagrammatically a prediction oscillating mechanism electrically operated and controlled in a manner similar to the mechanical device of FIGS. 4 and 5 and adapted to be used in conjunction with the rate measuring device 394*a* of FIG. 2 and the angular velocity function computer 409 of FIG. 3, the solid lines in said diagram indicating electric impulses and the dotted lines indicating mechanical displacements, as for example shaft rotations. FIG. 7 shows diagrammatically a form of electronic switch employed as part of the prediction oscillating mechanism of FIG. 6. FIG. 8 shows diagrammatically another form of electronic switch which may be employed as part of the prediction oscillating mechanism of FIG. 6. FIG. 9 shows diagrammatically the multi-vibrator and trigger circuit constituting the timing device for the oscillating prediction mechanism of FIG. 6, the solid lines indicating electric impulses and the dotted lines indicating mechanical displacements.

Referring to FIG. 6, there are provided four similar main networks 520, 521, 522 and 523 for setting initial values into integrating devices and for integrating with said initial settings to obtain prediction $\theta_t$ samples. Each of these main networks comprises a comparison or adding network 525 equivalent to a mechanical differential, an amplifier 526 at the output of said comparison network, an electronic switch 527 shown more fully in FIGS. 7 and 8 and controlled from a free-running multivibrator 528 shown more fully in FIG. 9, an integrating network designed with the proper constant to speed up integration so that an integration corresponding to a $T_p$ period is carried out therewith within a small fraction of this period and including a grounded condenser 531 and a resistance 532 for integrating the voltage output of the preceding main network starting from the initial settings derived from the output of the comparison network 525, the condenser corresponding to the output roller of a mechanical integrator, an amplifier 533 on the output side of the integrating network 531, 532 for the purpose of repeating the voltage $p^n\theta$ from the condenser 531 of the integrating network and for supplying integrator circuit load power without condenser drain, an integrator input voltage repeater comprising an adding network 537, a feed-back resistor 536, an unloading amplifier 535 and an inverter 534 to correct polarity of the feedback. The feedback leg of the adding network 537 from the amplifier 533 is necessary for system stabilization.

The values $\theta$, $p\theta$, $p^2\theta$ and $p^3\theta$ are fed as input voltages from the electrical rate measuring device 394*a* of FIG. 2 into the comparison networks 525 respectively of the four main networks 520, 521, 522 and 523 arranged as a chain. Current of predetermined square wave voltage characteristics is sent out by the multivibrator 528 to the switches 527 to close said switches for periods corresponding to the duration of certain selected phases (zero potential) of the voltage wave, as will be more fully described. This switch closing time interval is made sufficient to charge the condensers 531 in the integrating networks 531, 532 with voltages equal to $\theta$, $p\theta$, $p^2\theta$ and $p^3\theta$ respectively as initial settings. These initial settings are obtained by the comparison networks 525 having as one set of inputs the quantities $\theta$, $p\theta$, $p^2\theta$ and $p^3\theta$ obtained from the electrical rate measuring device 394*a* of FIG. 2 as described and having as the other set of input the quantities $\theta_t$, $p\theta_t$, $p^2\theta_t$ and $p^3\theta_t$ obtained as the outputs of the integrating circuits 531, 532 respectively during the previous integrating cycle, as will be more fully described. The comparison networks 525 thereby give outputs $\theta-\theta_t$, $p\theta-p\theta_t$, $p^2\theta-p^2\theta_t$ and $p^3\theta-p^3\theta_t$ respectively, which are amplified by the units 526, fed through the corresponding closed resetting switches 527 and supplied to the integrating circuit condensers 531 only as long as there is a difference in the voltages between the inputs of each of the comparison networks. When, as a result of closing the switches 527, $\theta_t$ becomes equal to $\theta$, $p_t$ becomes equal to $p\theta$ etc., the resetting action on the integrating circuits 531, 532 is complete, and we have initial voltages $\theta$, $p\theta$, $p^2\theta$ and $p^3\theta$ on the integrating condensers 531. At that time, the voltage from the multivibrator 528 passes through a phase (non-zero potential) to cause the switches 527 to open simultaneously, as will be more fully described, so that no further charging of the integrating circuit condensers 531 from the comparison networks 525 takes place, while successive integrations are initiated with the initial known $\theta$, $p\theta$, $p^2\theta$ and $p^3\theta$ settings in the integrating circuits.

Each of the main networks 520, 521 and 522 receives a voltage $p^n\theta_t$ from the output of the integrating network 531, 532 next in the chain as well as a voltage from the inverter 534 in said network which is the stabilizing feedback of the unloading amplifier 535 and a system stabilizing voltage from said main network output. The integrated results $\theta_t$, $p\theta_t$, $p^2\theta_t$ and $p^3\theta_t$ are incidentally fed back into the comparison networks 525 respectively, where no effect is produced since the switches 527 are open.

The differential equation satisfied by $\theta_t$ is $$p^4\theta_t = -\overline{w_1^2+w_2^2}\theta_t - \overline{w_1^2w_2^2}p^2\theta_t \qquad (85b)$$

To solve this equation for the quantity $\theta_t$, the quantity $\overline{w_1^2w_2^2}$ obtained from the output of the angular velocity function computer 409 of FIG. 3, after being smoothed by a unit (not shown) similar to the unit 475 of FIG. 4, is supplied as a slider movement to a potentiometer 540 at the same time the voltage $\theta_t$ is imposed on the coils thereof to obtain the product $\overline{w_1^2w_2^2\theta_t}$. At the same time, the quantity $\overline{w_1^2+w_2^2}$ obtained as the other output of the angular velocity function computer 409 of FIG. 3, after being smoothed in a manner described is supplied as a slider movement to a potentiometer 541 in conjunction with the quantity $p^2\theta_t$ to obtain the product $(\overline{w_1^2+w_2^2})p^2\theta_t$. The two products are added together in an adding network 542 to obtain the quantity $p^4\theta_t$ which after amplification in a unit 543 is imposed upon the main network 523 for the first integration step.

The angular velocity function quantities are fed into the device of FIG. 6 while the switches 527 are closed and the integrator network condensers 531 are being charged to the initial values $\theta$, $p\theta$, $p^2\theta$ and $p^3\theta$, and are locked at the same time the switches 527 are opened, so that no changes in these quantities in the system during the integrating cycle or prediction time can occur. This periodic locking of the angular velocity function quantities is accomplished by providing slip clutches and lock-out clutches (not shown) in the smoothing integrator set-ups for these quantities, similar to the clutches 477 and 478 of the smoothing integrator set-ups 475 and 476 employed in the mechanisms of FIGS. 4 and 5 and by interrupting the motor drive to the timing discs of the smoothing integrator set-ups, as in said mechanisms of FIGS. 4 and 5.

The predicted value of $\theta_t$ obtained at the end of each speeded $T_p$ integration period is sampled, stored and smoothed by a device 438*a* comprising an electronic sampling switch 545 operated from a trigger circuit 546 controlled from the multivibrator 528 in a manner to be described, a storing condenser 547, an unloading amplifier 548 and a smoothing network 550. At intervals at the end of each speeded $T_p$ integration period, the switch 545 is closed, and the predicted quantity $\theta_p$ is stored in the condenser 547, repeated therefrom by isolation amplifier 548 and smoothed by network 550. When the switches 527 are closed, the sampling switch 545 is open, but the voltage across the storing condenser 547 still continues to be repeated to the input of the smoothing network 550, so that a substantially continuous output is assured.

FIG. 7 shows a new and improved form of electronic switch which embodies certain features of the present invention and which may be employed not only for the switches 527 in the circuits for resetting initial values into the integrating circuits of the oscillating prediction mechanism shown in FIG. 6, but also for the sampling switch 545 in the storing, sampling and smoothing device 483*a* of said mechanism shown in FIG. 6. This switch comprises a pair of diodes 553 and 554 and a pair of diodes 555 and 556, the two pairs being arranged back to back to define a bidirectional conducting path from lead A to lead B and/or lead B to lead A. If the lead A is positive with respect to lead B, the conducting path is through the diodes 553 and 555 and if the lead A is negative with respect to lead B, the conducting path is through the diodes 554 and 556. To employ this diode configuration as a switch, a control voltage is imposed on the circuit at points $C_1$ and $C_2$ through resistors $R_1$ and $R_2$ respectively connected to two leads $D_1$ and $D_2$ at their control ends. These leads $D_1$ and $D_2$ in the case of the rate resetting switches 527 are connected to the multivibrator 528 and in the case of the sampler switch 545 are connected to the controlled multivibrator 571 in the trigger circuit 546 as shown in FIGS. 6 and 9.

Resistor $R_1$ is connected to the negative potential of a source of square wave voltage through its lead $D_1$ and resistor $R_2$ is connected to the positive potential of this source of square wave voltage through its lead $D_2$. When the square wave voltage of the source is at the phase to impose a negative potential on the lead $D_1$ and a positive potential on the lead $D_2$, the diodes 555 and 556 are not conducting and the lead B is completely isolated from lead A. Diodes 553 and 554 on the other hand are conducting and a circulating current exists in the loop $D_2$, $R_2$, $C_2$, 554, A, 553, $C_1R_1D_1$. Since the leads $D_1$ and $D_2$ are of opposite polarity but equal in amplitude, a virtual ground exists at A when the switch is open.

When the voltage in the leads $D_1$ and $D_2$ is zero due to the corresponding phase of the square wave voltage of the source, either the diode 555 or the diode 556 becomes conducting, so that the switch is closed from lead A through the diodes 553 and 555 to lead B or from lead A through the diodes 554 and 556 to the lead B, according to the sign of the potential of the lead A with respect to the lead B.

FIG. 8 shows another new and improved form of electronic switch which embodies certain features of the present invention and which may be employed for the resetting switches 527 and the sampler switch 545 in the oscillating prediction mechanism of FIG. 6. This modified form of switch designated by the numerals 545*b*, 597, 598, 600 and 601 in the oscillating prediction mechanism of FIGS. 15 and 16 to be described, is similar to the switch shown in FIG. 7, except that the two resistors $R_1$ and $R_2$ have a common lead or connection D at their control end connected to a source of square wave voltage through a multivibrator as in the case of the switch of FIG. 7. If this lead D is at a high positive potential, diodes 553 and 556 are non-conductive and the circuit from A to B is thus open and if the lead D is highly negative, diodes 555 and 554 are non-conductive and the circuit from A to B is open. The switch is closed in either case by driving D to ground or zero potential. If resistors $R_1$ and $R_2$ are high (megohms), points $C_1$ and $C_2$ assume a potential approximating the mean of the potential of the leads A and B and the switch is thereby closed.

While the switch of FIG. 8 is open (high potential at D) one pair of diagonally opposite diodes are non-conducting as indicated above. Simultaneously, however, the other pair of diagonally opposite diodes are conducting, and thus serve to define part of a conducting path from A to D and from B to D through resistors $R_1$ and $R_2$ respectively. Since $R_1$ and $R_2$ are resistors of high value, these paths do not detract in general from the operation of the diode circuit as a switch. If, however, circuit considerations at A and B are such as to make such a condition undesirable, the circuit shown in FIG. 7 is more desirable.

FIG. 9 shows the circuits of the multivibrator 528 and of the trigger circuit 546 for controlling the resetting switches 527 and the sampler switch 545 in the prediction oscillating mechanism of FIG. 6 and for thereby controlling the timing and sequencing of the different operations of the oscillating prediction system. FIG. 10 is a chart indicating the different cycles of operation of the oscillating prediction mechanism and the corresponding voltage wave and pulse characteristics emanating from different parts of the multivibrator 528 and of the trigger circuit 546. FIG. 9 shows in conjunction with the parts in full lines for electric impulses and dotted lines for mechanical displacements, one form of multivibrator to be used to control directly only one set of electronic switches of the type indicated in FIGS. 7 and 8 simultaneously into open and closed position as in the circuit of FIG. 6 and in conjunction with the added summing network parts indicated in dot and dash lines, shows an alternative form to control directly two sets of electronic switches of the type shown in FIGS. 7 and 8 alternately, so that one set is open and the other set is closed, as in the circuit of FIGS. 15 and 16 to be described.

The multivibrator 528 is of the well-known free running type operating at natural frequency, and considering the form shown without the summing network indicated in dot and dash lines, has two output leads $D_1'$ and $D_2'$ connecting to the control leads $D_1$ and $D_2$ of the electronic rate resetting switches 527 shown in FIGS. 6 and 7 to control said switches. The output voltage of this multivibrator 528 has square wave characteristics varying from zero to positive potential and back to zero, as shown by the curve G of FIG. 10, the wave having equal periods, *g* of zero potential separated by equal periods *g'* of positive potential. The output lead $D_2'$ of positive potential is connected through a condenser 560 to the trigger circuit 546 to translate the voltage wave into positive and negative pulses of short duration occurring whenever the wave G goes through a reverse phase, as indicated by the curve H.

The trigger circuit 546 includes a pair of triodes 561 and 562, a sweep gating tube 563, a pair of charging condensers 564 and a boot strap circuit including a triode 566 and a condenser 567, to cause the condensers 564 to charge linearly instead of exponentially. The output of the triode 562 feeds through a condenser 568 and an amplifier 570 and branches off from the output of this amplifier, with one branch going to a controlled multivibrator 571 having output leads $D_1''$ and $D_2''$ corresponding to the control leads $D_1$ and $D_2$ in the electronic sampling switch 545 shown in FIGS. 6 and 7 to control said sampling switch, and with the other branch going to a controlled multivibrator 572. The output of the condenser 560 feeds into this multivibrator 572 and the output of said multivibrator connects to the control grid of the sweep gating tube 563.

The predicted time period $T_p$ determined as a shaft rotation or mechanical displacement from the prediction time computer disclosed in the aforesaid copending application is imposed as a slider movement upon the resistance coils of a potentiometer 573 excited by a reference voltage and since the value of $T_p$ progressively decreases as the predicted time approaches, the output voltage of potentiometer 573 will have a linear decreasing characteristic indicated by the downwardly sloping line A, A', A'' etc. in FIG. 10. This progressively decreasing voltage is constantly impressed on the grid of the triode 561. This causes the triode 561 to conduct and in so doing furnishes a cut-off bias for triode 562 through the common cathode resistor 561*a*.

During the periods when the rate resetting switches 527 in the prediction oscillating mechanism of FIG. 6 are to be closed, the wave G (FIG. 10) corresponding to the output of the multivibrator 528 is passing through the zero potential phases *g*, so that said switches are closed, as already described in connection with FIG. 7. During these *g* phases of operation, no pulses are being sent to the multivibrator 572 of the trigger circuit 546, as indicated by the curve H (FIG. 10), the triode 562 is non-conducting and the sweep gating tube 563 is conducting to ground, so that no current reaches the condensers 564. As soon as the voltage G from the free running multivibrator 528 changes from zero potential towards positive potential at the end of a zero potential period *g*, the rate resetting switches 527 in the oscillating prediction mechanism of FIG. 6 are simultaneously opened, and the rate resetting interval thereby terminated. At the same time, this changeover from zero potential to positive potential, creates a positive pulse *h* (FIG. 10) at the output of the condenser 560, which is fed into the input of the controlled multivibrator 572 (FIG. 9) to produce at the output thereof a square wave voltage of varying periods, as shown by the curve J in FIG. 10. The negative phases of this voltage J impressed upon the grid of the tube 563 causes said tube to become non-conducting, allowing a voltage, modified by the boot strap circuit 566, 567 to be built up in the condensers 564 along lines *a*A, *a'*A', *a''*A'', etc. (FIG. 10) until the charged voltages indicated by the points A, A', A'' etc. are the same as the voltages derived from the output of the $T_p$ potentiometer 573. While the condensers 564 are charging, the triode 562 is non-conducting but the potential of its grid is varying as indicated by the curve K (FIG. 10) following a varying saw-tooth wave pattern. When the voltage impressed upon the grid of the triode 562 is the same as the voltage impressed on the grid of the triode 561 from the output of the $T_p$ potentiometer 573, the triode 562 becomes conducting and there is created a voltage drop at the plate of triode 562, which when amplified (and differentiated) in the unit 570 has the characteristic shown by the curve L in FIG. 10. The pulse l created at the instant the voltages on the grids of the two triodes 561 and 562 become equal is impressed upon the controlled multivibrator 571 and causes the voltage emanating from said multivibrator to go to zero potential, thereby causing the sampling switch 545 of the oscillating prediction mechanism of FIG. 6 controlled from said multivibrator to be closed as already described, so that the predicted $\theta_t$ quantity is sampled at the time $T_p$ of the prediction integration interval. The voltage at point M of FIG. 9 remains at zero for periods *m* indicated in the curve M (FIG. 10), these periods being long enough to permit proper sampling and storing of the sampled quantity of $\theta_t$ in the condenser 547 of the sampling, storing and smoothing device 483*a* of FIG. 6.

The pulse l from the output of the amplifier 570 at the same time it is impressed upon the controlled multivibrator 571 to close the sampling switch 545 (FIG. 6) is also impressed upon the controlled multivibrator 572 and causes the output voltage from said multivibrator 572 to switch from a negative potential to a positive potential, as indicated by the curve J, and this restores the sweep gating tube 563 to quiescent state until the next rate resetting cycle, when the cycle is again initiated by the next positive pulse *h* (FIG. 10) impressed upon the controlled multivibrator 572 from the free running multivibrator 528. Although negative pulses *h'* are discharged from the condenser 560, during the switchover from a positive potential to zero potential in the input to said condenser, these negative pulses have no effect on the controlled multivibrator 572.

The integrating networks 531, 532 in the oscillating prediction mechanism of FIG. 6 are designed with the proper constant to speed up integration, so that an integrating operation corresponding to a full $T_p$ period at the beginning of a $T_p$ run is carried out within a small fraction of this period indicated by the periods $T_p'$ in FIG. 10, as already described. The speeded integration periods $T_p'$, $T_p''$, $T_p'''$ etc. become progressively smaller, as the end of the $T_p$ run is reached, since each speeded up integration period corresponds to a progressively smaller $T_p$ period. The trigger circuit 546 is designed so that the intervals during the charging of the condensers 564 to the points A, A', A'' etc. indicated by the periods $T_p'$, $T_p''$, $T_p'''$ etc. in FIG. 10 correspond to the periods required for integration by networks 531, 532 (FIG. 6) at the speeded rate to cover the actual $T_p$ periods.

The rate resetting periods may be measured in terms of milliseconds, as for example one millisecond, and the maximum $T_p'$ period may also run into milliseconds, as for example 9 or 10 milliseconds. Therefore, during the full $T_p$ run, the oscillating prediction mechanism goes through many hundreds of rate resetting and integrating cycles.

The multivibrator 528 of FIGS. 6 and 9 is not only operable to control the rate resetting switches 527 (FIG. 6) through the leads $D_1'$ and $D_2'$ (FIG. 9) of said multivibrator as already described, but is also operable to control other similar electronic switches (not shown) for controlling the lock-out clutches (not shown) if such are used, in the smoothing integrator units for the angular velocity function quantities $w_1^2w_2^2$ and $w_1^2+w_2^2$, similar to the clutches 477 and 478 of the smoothing integrator units 475 and 476 employed in the system of FIGS. 4 and 5 and to control similar electronic switches (not shown) for interrupting the motor drive to the timing discs of the smoothing integrator units and for at the same time applying a brake to the shaft driving said discs, as in said system of FIGS. 4 and 5. These locking, drive interrupting and brake applying control switches may be controlled either through the leads $D_1'$ and $D_2'$ in the multivibrator 528 or if one set of electronic switches is to be closed, while another set is to be opened, and if the condition of these two sets of switches is to be reversed at the same time, then summing networks may be added to the circuit of the multivibrator 528, as indicated in dot and dash lines in FIG. 9 to provide the multivibrator 528 with the proper bias, so that while one set of output leads is at zero, the other set of leads is at positive or negative potential. One set of these leads is connected to one set of electronic switches to be opened and closed simultaneously and the other set of leads is connected to the other set of electronic switches. By means of this arrangement, the angular velocity function quantities $w_1^2w_2^2$ and $w_1^2+w_2^2$ are fed into the device of FIG. 6, while the rate setting switches 527 are closed and the integrator network condensers 531 are being charged to initial values and are locked at the same time the switches 527 are opened, so that no changes in these quantities in the device during the integrating predicting cycle can occur. It may not be necessary for the quantities $w_1^2w_2^2$ and $w_1^2+w_2^2$ to be locked in position during the very short time required for the electrical integration and prediction period, since the change in these quantities during a time of the order of milliseconds would be entirely negligible.

FIG. 11 shows diagrammatically one manner in which the principal devices of the oscillating system are assembled to predict the pitch angle. In this assembly, the valve $\theta_1$ which corresponds to the value $P_o$, the present pitch angle and which is derived as the shaft output of the stable element, is fed into the rate measuring device 395 shown in FIG. 1, to obtain the quantities $\theta$, $p\theta$, $p^2\theta$, $p^3\theta$, $p^4\theta$ and $p^5\theta$ as shaft rotations. These latter quantities fed into the angular velocity function computer 409 of FIG. 3 result in rotational quantities $w_1^2w_2^2$ and $w_1^2+w_2^2$. These angular velocity functions are smoothed out in the smoothing devices 475 and 476 of FIG. 4, and the resulting quantities $\overline{w_1^2w_2^2}$ and $\overline{w_1^2+w_2^2}$ in conjunction with the quantities $\theta$, $p\theta$, $p^2\theta$ and $p^3\theta$ are fed into the mechanical oscillating prediction mechanism 439 shown in FIG. 4 or the electrical oscillating prediction mechanism 439a shown in FIG. 6. If the oscillating prediction mechanism is of the mechanical type shown in FIG. 4 as device 439, then the quantities $\theta$, $p\theta$, $p^2\theta$ and $p^3\theta$ fed therein, are mechanical or rotational shaft displacements and the sequencing and timing device for controlling the sequences and periods of operation of the cycles is of the mechanical type shown as the device 489 in FIG. 5. If the oscillating prediction mechanism is of the electrical type shown in FIG. 6 as device 439a, then the mechanical displacement quantities $\theta$, $p\theta$, $p^2\theta$ and $p^3\theta$ must be converted into corresponding voltages before they can be delivered to the oscillating prediction mechanism 439a, and the sequencer and timer device for controlling the sequences and periods of operation of the cycles is of the electrical type represented by the multivibrator 528 and trigger circuit 546 in FIGS. 6 and 9.

The quantity $\theta_t$ obtained from the output of the oscillating prediction system is stored, sampled and smoothed for continuous delivery in a prediction storing, sampling and smoothing device. If the oscillating prediction mechanism employed is of the mechanical type represented by the mechanism 439 of FIG. 4, the prediction storing, sampling and smoothing device is similar to the mechanical device 483 illustrated in FIG. 4. If the oscillating prediction mechanism employed is of the electrical type as shown in FIG. 6, then the prediction storing, sampling and smoothing device is similar to the electrical device 483a illustrated in FIG. 6.

FIG. 12 shows diagrammatically another manner in which the principal devices of the oscillating system are assembled to predict the pitch angle. The assembly of FIG. 12 is similar to that shown in FIG. 11 and the components devices of the assembly of FIG. 12 are similar to those of FIG. 11, except that the rate measurement is aided and averaged by means of a feed-back of the quantity $p^6\theta'$ equal to $-\overline{w_1^2w_2^2}p^2\theta-\overline{w_1^2+w_2^2}p^4\theta$ back to the carriage of the integrator 396 of the rate measuring device 394b supplying the quantity $p^5\theta$ as shown in FIG. 13, to give more accurate values of $\theta$, $p\theta$, $p^2\theta$, $p^3\theta$ used in setting initial conditions of the oscillating system.

The relationship $$p^6\theta=-w_1^2w_2^2p^2\theta-(w_1^2+w_2^2)p^4\theta$$

is a further derivative of the relationship (85). Employing smoothed values of the angular velocity functions, we obtain the feed-back value $$p^6\theta'=-\overline{w_1^2w_2^2}p^2\theta-\overline{w_1^2+w_2^2}p^4\theta \qquad (85c)$$

The rate measuring device 394b to receive the feed-back $p^6\theta'$ is shown partially in FIG. 13, the rest of this device being the same as the rate measuring device 394 shown in FIG. 1. The rate measuring device 394b has a differential 585 having an input derived from output of comparison differential 395 (FIG. 1) and an input $p^6\theta'$ derived in a manner to be described. The output of this differential 585 is fed into the carriage of the integrator 396 (FIG. 13).

To obtain the necessary feed-back quantity $p^6\theta'$, the smoothed quantities $\overline{w_1^2w_2^2}$ and $\overline{w_1^2+w_2^2}$ from the output of the smoothers 475 and 476 (FIG. 4) are fed to multipliers 586 and 587 (FIG. 12) respectively. Into the multiplier 586 is also fed the quantity $p^2\theta$ from the output of the rate measuring device 394b to obtain the product $w_1^2w_2^2p^2\theta$ and into the multiplier 587 is fed the quantity $p^4\theta$ from the output of the rate measuring device 394b to obtain the product $(w_1^2+w_2^2)p^4\theta$. These two products are algebraically added in a differential 588 to obtain the feed-back quantity $p^6\theta'$ according to relationship (85c). This feed-back quantity $p^6\theta'$ is then employed to modify the setting of the carriage of the integrator 396 of FIG. 13.

In all other respects, the construction and operation of the oscillating system of FIG. 12 is similar to that of FIG. 11.

FIGS. 14, 15, 16 and 17 show a modified form of oscillating system in which the rate measuring device and the oscillating prediction mechanism are combined to permit the rate measuring circuit to be employed during the rate measuring interval for determining the quantities $\theta$, $p\theta$, $p^2\theta$, $p^3\theta$, $p^4\theta$, and $p^5\theta$ as well as to permit part of the rate measuring circuit to be employed during the integrating period for determining the prediction quantity $\theta_t$. FIG. 14 shows the general assembly of the oscillating system in block diagrammatic form; FIGS. 15 and 16 are adapted to be combined along the dot and dash break lines A, and when so combined conjointly show the oscillating system in greater detail, the solid lines indicating electric impulses, the dotted lines indicating mechanical displacements such as shaft rotations; and FIG. 17 shows the oscillating prediction mechanism isolated from the remainder of the rate measuring part of the oscillating system, the solid lines indicating electric impulses, the dotted lines indicating mechanical displacements such as shaft rotations.

Referring to FIGS. 15 and 16, the oscillating system comprises a combined rate measuring device and oscillating predicting mechanism 595 and an angular velocity function computer 409*b* similar to the angular velocity computer 409 of FIG. 3. Like numbers indicate similar parts in the angular velocity function computer 409 of FIG. 3 and in the angular velocity function computer 409*b* of FIG. 16.

The output quantities $w_1^2w_2^2$ and $w_1^2+w_2^2$ from the angular velocity function computer 409*b* (FIG. 16), before being delivered to the oscillating prediction mechanism of FIG. 15 are smoothed to values $\overline{w_1^2w_2^2}$ and $\overline{w_1^2+w_2^2}$ respectively by means of the integrator type smoothing units 475*b* and 476*b*, similar to units 475 and 476 respectively of FIG. 4.

It may be desirable that the quantities $w_1^2w_2^2$ and $w_1^2+w_2^2$ be locked in value during the integration prediction period, as in the mechanism of FIG. 4. For that purpose, the arrangement of FIG. 16 is similar to that of FIG. 4, the input connection from the angular velocity function computer 409*b* to the differential of each follow-up unit 475*b* and 476*b* (FIG. 15) having a clutch 477*b* (FIG. 16), which will slip when the driven element of the clutch is locked against rotation. For locking this driven element, there is provided a second clutch 478*b*, one element of which is connected to the driven element of the slip clutch 477*b*, the other element being secured to a fixed frame 479*b*. The clutches 478*b* may be solenoid controlled through an electronic switch 596 of the type shown in FIGS. 7 and 8 regulated and sequenced from a free running multivibrator 528*b* similar to the multivibrator 528 shown in FIGS. 6 and 9 and from a trigger circuit 546*b* similar to the trigger circuit 546 of FIGS. 6 and 9 and similarly controlled from a $T_p$ potentiometer 573*b*.

It may not be necessary for the quantities $w_1^2w_2^2$ and $w_1^2+w_2^2$ to be locked in position during the very short time required for the electrical integration and prediction period, since the change in these quantities during a time of the order of milliseconds would be entirely negligible.

The rate measuring device in FIG. 15 is similar to that shown as 394*a* in FIG. 2, similar numbers in the two figures, except for the letters *a* and *b*, corresponding to similar parts. This rate measuring device in FIG. 15 comprises a comparison network 395*b*, integrating network 396*b*, 397*b*, 398*b*, 399*b*, 400*b* and 401*b* and system stabilizing resistances of feed-back elements 402*b*, 403*b*, 404*b*, 405*b* and 406*b*.

In order to convert the rate measuring device into an oscillating prediction mechanism, the stabilizing resistances 403*b*, 404*b*, 405*b* and 406*b* are grounded at the proper time. For that purpose, the circuit of these resistances is connected to the output of the comparison network 395*b* by an electronic switch 597 and is connected to ground through an electronic switch 598, and the circuit of the integrating networks 396*b* and 397*b* is connected to the circuit of the integrating networks 398*b*, 399*b*, 400*b* and 401*b* by electronic switches 600 and 601 so that said integrating networks 396*b* and 397*b* may be isolated from said integrating networks 398*b*, 399*b*, 400*b* and 401*b* during the prediction integrating cycle. These electronic switches 597, 598, 600 and 601 may be of the type shown in FIG. 8, each with a single control lead, as indicated in FIG. 15, regulated from the multivibrator 528*b*, which may be similar to the multivibrator 528 shown in FIG. 9 but with the summing networks added as shown in dot and dash lines in FIG. 9, to provide the multivibrator output with a proper bias, and therefore with two sets of output leads alternating in voltage at predetermined intervals to and from zero potential. These electronic switches 597, 598, 600 and 601 may also be of double control lead type shown in FIG. 7, in which case the ground switch 598 may be dispensed with, and the grounding of the stabilizing resistances 403*b*, 404*b*, 405*b* and 406*b*, achieved through the electronic switch 597 grounding through the circuit of the multivibrator 528*b*, when the proper voltage phase is reached for such action.

When the stabilizing resistances 403*b*, 404*b*, 405*b* and 406*b*, are grounded for conversion of the rate measuring device into the oscillating prediction mechanism, the integrating networks 398*b*, 399*b*, 400*b* and 401*b* of the rate measuring device, with the initial rate values charged or set into their condensers, correspond to the integrating networks 531, 532 in the oscillating prediction mechanism of FIG. 6, as shown in FIG. 17.

The oscillating prediction mechanism in the system shown in FIG. 15 comprises as in the oscillating prediction mechanism shown in FIG. 6, a potentiometer 540*b* corresponding to the potentiometer 540 of FIG. 6, for obtaining the product $\overline{w_1^2w_2^2}\ \theta_t$, a potentiometer 541*b* corresponding to the potentiometer 541 of FIG. 6 for obtaining the product $\overline{(w_1^2+w_2^2)p^2}\ \theta_t$, an adding network 542*b* corresponding to the adding network 542 of FIG. 6 for adding the two products to obtain the quantity $p^4\theta_t$ and an amplifier 543*b* corresponding to the amplifier 543 of FIG. 6 for amplifying this quantity $p^4\theta_t$ before it is fed through the electronic switch 601 to the first integrating network 398*b* of the oscillating prediction mechanism.

The circuits of the potentiometers 540*b* and 541*b*, of the adding network 542*b* and of the amplifier 543*b* may be cut-off or isolated from the integrating networks 396*b*, 397*b*, 398*b*, 399*b*, 400*b* and 401*b* of the rate measuring device during the rate measuring interval by the electronic switch 601 controlled from the multivibrator 528*b*.

The predicted value $\theta_p$, obtained by sampling $\theta_t$ at time $T_p$ during each successive integration of a set, is sampled, stored and smoothed by a device 483*b* similar to the device 483*a* of FIG. 6 and comprising an electronic sampling switch 545*b*, similar to the sampling switch 545 of FIG. 6, except that it is shown as the single control lead type shown in FIG. 8. This sampling switch 545*b* is controlled by the trigger circuit 546*b*, as in the case of the mechanism of FIG. 6.

Referring further to the system of FIGS. 15 and 16, it is assumed the circuits in the system are connected up to measure the rates as derivatives of $\theta_1$ the present pitch angle. During this part of the cycle, the electronic switches 597 and 600 are closed and the electronic switches 598, 601 and 545*b* are open. The rate measuring device is therefore connected as shown in FIG. 2. This condition lasts long enough for the angular velocity functions $w_1^2w_2^2$ and $w_1^2+w_2^2$ to be determined from $\theta$ and its first five derivatives by means of the angular velocity function computer 409*b* in the manner described in connection with the computer 409 of FIG. 3.

The second part of the cycle is then initiated by isolating the section of the rate measuring device which constitutes part of the oscillating prediction mechanism and by connecting the potentiometers 540*b* and 541*b*, the adding network 542*b* and the amplifier 543*b* into the circuit of said oscillating prediction mechanism to complete said mechanism. This is accomplished by opening switches 597 and 600 and closing switches 598 and 601. At the same time, the electronic switch 596 is closed to energize the clutches 478*b* and lock the quantities $w_1^2w_2^2$ and $w_1^2+w_2^2$ to the frames 479*b*. Accordingly, no change in these quantities can occur during the prediction time and the oscillating prediction mechanism will have the constant angular velocities $w_1$ and $w_2$ set therein. At the end of the time interval $T_p$, measured at a speeded rate $T_p'$, a pulse is triggered from the trigger circuit 546*b* to close the sampler switch 545*b*. This pulse is of sufficient duration to allow charging of the storage condenser in the storing, sampling and smoothing device 483*b*. At proper intervals, the pulse from the multivibrator 528*b* restores the circuits to their original rate measuring condition and the whole cycle of operation is repeated.

The present invention has been disclosed as applicable broadly to the determination of a quantity in a fluctuating system at a predetermined future time and specifically to the determination of the pitch angle of a floating deck. However, the same equations, procedures and mechanisms are applicable to the determination of the deck level (heave) at the predetermined future time. In that case, $\theta_i$ in the equation represents the present deck height and $\theta_p$ represents the predicted deck height at the end of the future predetermined interval $T_p$.

The present deck height $\theta_i$ can be obtained from a heavemeter (accelerometer) disclosed in the aforesaid copending application.

What is claimed is:

1. An oscillating prediction apparatus for predicting the value $\theta_p$ of a fluctuating system at the end of a future predetermined interval $T_p$, which comprises means for measuring the rates of the initial or present values of said system, means responsive to the determination of said initial rates for determining the initial functions of the angular velocities of the sine wave components of said system at the initial or present time, and integrating means responsive to the determination of said initial rates and said initial angular velocity functions and operating for the interval $T_p$ but at a speeded time scale to obtain the value $\theta_p$, all of said means operating through recurrent cycles but with new initial rates and new angular velocity functions to obtain a succession of $\theta_p$ values during the interval $T_p$.

2. An oscillating prediction apparatus for predicting the value $\theta_p$ of a fluctuating system at the end of a future predetermined interval $T_p$, which comprises means for determining as initial conditions a number of rates of the present initial value $\theta_i$ in the series $\theta$, $p\theta$, $p^2\theta$ etc., wherein $$p^n\theta=\frac{d^n\theta}{dt^n}$$

and $\theta$ is a function of $\theta_i$, means for mechanizing an equation of the general derivative form $$p^n\theta+(w_1^2+w_2^2)p^{n-2}\theta+w_1^2w_2^2p^{n-4}\theta=0$$

for the interval $T_p$ from the starting point with said initial conditions set and with the time scale speeded up to obtain the value $\theta_p$, in said equation $w_1$ and $w_2$ representing the angular velocities of the two sine wave components of said fluctuating system, and means for remechanizing said equation repeatedly with said initial conditions reset in the mechanizing operations according to their true magnitudes, to obtain a series of values of $\theta_p$ during said interval $T_p$.

3. An oscillating prediction apparatus for predicting the value $\theta_p$ of a fluctuating system at the end of a future predetermined interval $T_p$, which comprises means for measuring the rates of the initial starting value $\theta_i$ in the series $\theta$, $p\theta$, $p^2\theta$. etc., wherein $$p^n\theta=\frac{d^n\theta}{dt^n}$$

and $\theta=\theta_i$ plus an error signal derived through a comparison operation, means for determining with said initial rates the initial angular velocity functions $w_1^2w_2^2$ and $w_1^2+w_2^2$ from the equation $$p^n\theta+(w_1^2+w_2^2)p^{n-2}\theta+w_1^2w_2^2p^{n-4}\theta=0$$

wherein $w_1$ and $w_2$ represent the initial angular velocities of the sine wave components of the fluctuating system, means for mechanizing the equation $$p^n\theta_t+(w_1^2+w_2^2)p^{n-2}\theta_t+w_1^2w_2^2p^{n-4}\theta_t=0$$

through successive integrating stages with said initial rates and said initial angular velocity functions set in the mechanizing operation and for the interval $T_p$ from the starting point with the time scale speeded up to obtain the value $\theta_p$ in the latter equation, $\theta_t$ indicating the value of $\theta$ at a future time $t$, and means for remechanizing said equations repeatedly with said initial rates and said angular velocity functions reset in the mechanizing operation according to their revised values, to obtain a series of discrete values of $\theta_p$ during said interval $T_p$.

4. An oscillating prediction apparatus for predicting the value $\theta_p$ of a fluctuating system at the end of a future predetermined interval $T_p$, which comprises means for continuously measuring the rates of the present values of said system, equation mechanizing means responsive to the determination of said present rates for continuously determining the functions of the present angular velocities of the sine wave components of said system, equation mechanizing and integrating means including a series of integrators operable through recurrent cycles during the $T_p$ interval, means for setting said rates as initial values into said integrators at the beginning of each integrating cycle, means for setting the present angular velocity functions as initial values into said mechanizing and integrating means and for clamping said functions at a fixed value at the beginning of each integrating cycle, said equation mechanizing and integrating means including means for integrating at a speeded scale and being operable to obtain an output value $\theta_t$ at the time $t$ and the output value $\theta_p$ when $t$ is equal to $T_p$, and means operable at the end of each speeded $T_p$ interval of each integrating cycle for sampling the output of said equation mechanizing and integrating means.

5. An oscillating prediction apparatus for predicting the value $\theta_p$ of a fluctuating system at the end of a future predetermined interval $T_p$, which comprises means for continuously measuring the rates of the present values of said system, equation mechanizing means responsive to the determination of said present rates for continuously determining the functions of the present angular velocities of the sine wave components of said system, mechanical equation mechanizing and integrating means including a series of mechanical integrators with respective carriages into which the inputs to be integrated may be fed, heart cam displacement storing and releasing means for setting said rates as initial values into said integrator carriages at the beginning of each integrating cycle, means for setting the present angular velocity functions as initial values into said equation mechanizing and integrating means for clamping said functions at a fixed value at the beginning of each integrating cycle, said equation mechanizing and integrating means including means for integrating at a speeded scale and being operable to obtain an output value $\theta_t$ at the time $t$ and the output value $\theta_p$ when $t$ is equal to $T_p$, and means operable at the end of the speeded $T_p$ interval of each integrating cycle for sampling the output of said equation mechanizing and integrating means.

6. An oscillating prediction apparatus for predicting the value $\theta_p$ of a fluctuating system at the end of a future predetermined interval $T_p$, which comprises means for continuously measuring the rates of the present values of said system, equation mechanizing means responsive to the determination of said present rates for continuously determining the functions of the present angular velocities of the sine wave components of said system, electrical equation mechanizing and integrating means including a series of integrating networks each including a condenser for storing a voltage quantity to be integrated, means for charging said condensers with voltages corresponding to said rates as initial values at the beginning of each integrating cycle, means for setting the present angular velocity functions as initial values into said equation mechanizing and integrating means, and for clamping said functions at a fixed value at the beginning of each integrating cycle, said integrating networks being designed to integrate at a speeded scale and said equation mechanizing and integrating means being operable to obtain an output value $\theta_t$ at the time $t$ and the output value $\theta_p$ when $t$ is equal to $T_p$, a storing and smoothing network including a storing condenser and a smoothing condenser, a sampler switch non-conductive during integration and located between the output of said equation mechanizing and integrating means and said storing and smoothing network, and means automatically operable at the end of the speeded $T_p$ interval of each integrating cycle for closing said switch and thereby sampling the $\theta_p$ output of said equation mechanizing and integrating means.

7. An oscillating prediction apparatus for predicting the value $\theta_p$ of a fluctuating system at the end of a future predetermined interval $T_p$ as described in claim 6, said rate measuring means and said equation mechanizing and integrating means being separate, said apparatus including switches between said rate measuring means and the integrating networks of said equation mechanizing and integrating means, means for closing said switches for a period prior to the integrating cycle, to permit the condensers in the integrating networks to be charged to the values of the present rates measured, means for opening said switches when said condensers have been sufficiently charged to the values of the present rates to initiate the integrtaing cycle, and means for again closing said switches at the end of the integration cycle.

8. An oscillating prediction apparatus for predicting the value $\theta_p$ of a fluctuating system at the end of a future predetermined interval $T_p$ as described in claim 6, said rate measuring means and said equation mechanizing and integrating means being combined and being provided with joint integrating networks, said apparatus including switch means operable to convert the combined unit into a rate measuring device prior to each integrating cycle, and operable to convert the unit into equation mechanizing and integrating means at the beginning of each integrating cycle.

9. An oscillating prediction apparatus for predicting the pitch angle of a floating deck at the end of a future predetermined interval, which comprises means for determining the present pitch angle and the rate functions thereof, means for deriving the future characteristic of the pitch angle variations predicated upon said present pitch angle and said rate functions, equation mechanizing means for predicting from the future characteristic of the pitch angle variations derived the pitch angle at the end of said predetermined interval, and means for cyclically repeating over and over again the sequential operations of determining the present pitch angle and rate functions thereof, deriving the future characteristic of the pitch angle variations and predicting therefrom the pitch angle at the end of said interval, to obtain a succession of said predicted values predicated on revised present pitch angles and rate functions thereof.

10. An oscillating prediction apparatus for predicting the pitch angle of a floating deck at the end of a future predetermined interval $T_p$ as described in claim 3, wherein $\theta_i$ is the present pitch angle and $\theta_p$ is the predicted pitch angle at the end of the future predetermined interval $T_p$.

11. An oscillating prediction apparatus for predicting the height of a floating deck at the end of a future predetermined interval, which comprises means for determining the present deck height and the rate functions thereof, means for deriving the future characteristic of the deck height variations predicated upon said present deck height and said rate functions, equation mechanizing means for predicting from the future characteristic of the deck height variations derived, the deck height at the end of said predetermined interval, and means for cyclically repeating over and over again the sequential operations of determining the present deck height and rate functions thereof, deriving the future characteristic of the deck height variations and predicting therefrom the deck height at the end of said interval, to obtain a succession of said predicted deck heights predicated on revised present deck heights and rate functions thereof.

12. An oscillating predicting apparatus for predicting the height of a floating deck at the end of a future predetermined interval $T_p$ as described in claim 3, wherein $\theta_i$ is the present deck height and $\theta_p$ is the predicted deck height at the end of the future predetermined interval $T_p$.

References Cited by the Examiner

UNITED STATES PATENTS 2,660,793 12/53 Holschuh et al. ---------- 343—7

MALCOLM A. MORRISON, *Primary Examiner.*

NORMAN H. EVANS, *Examiner.*